(12) United States Patent
Takai et al.

(10) Patent No.: US 10,076,948 B2
(45) Date of Patent: Sep. 18, 2018

(54) DAMPER OPENING AND CLOSING DEVICE

(71) Applicant: TOYODA GOSEI CO., LTD., Kiyosu-shi, Aichi-ken (JP)

(72) Inventors: Hajime Takai, Kiyosu (JP); Minoru Shibata, Kiyosu (JP); Mitsuo Ogura, Kiyosu (JP); Hiroshi Sakai, Kosai (JP); Kenji Asano, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 287 days.

(21) Appl. No.: 14/169,371

(22) Filed: Jan. 31, 2014

(65) Prior Publication Data
US 2014/0230942 A1    Aug. 21, 2014

(30) Foreign Application Priority Data

Feb. 21, 2013  (JP) ................................ 2013-032316
Apr. 26, 2013  (JP) ................................ 2013-094458

(51) Int. Cl.
*B60H 1/34*    (2006.01)

(52) U.S. Cl.
CPC .......... *B60H 1/3442* (2013.01); *B60H 1/345* (2013.01)

(58) Field of Classification Search
CPC .............. B60H 1/34; H05K 7/20; F24F 13/04
USPC ................ 454/155, 184, 69, 70, 71
See application file for complete search history.

(56) References Cited

U.S. PATENT DOCUMENTS

| 4,928,582 A | * | 5/1990 | Elfverson | B60H 1/3414 454/155 |
| 5,238,448 A | | 8/1993 | Komori et al. | |
| 5,575,715 A | * | 11/1996 | Norbury, Jr. | B60H 1/3442 454/286 |
| 5,890,958 A | * | 4/1999 | Greiner | B60H 1/3414 454/155 |

(Continued)

FOREIGN PATENT DOCUMENTS

| CN | 101153741 A | 4/2008 |
| CN | 201342920 Y | 11/2009 |

(Continued)

OTHER PUBLICATIONS

Office Action dated Mar. 9, 2016 in the corresponding CN application No. 201410059750.6 (with English translation).

(Continued)

*Primary Examiner* — Steven B McAllister
*Assistant Examiner* — Samantha Probst
(74) *Attorney, Agent, or Firm* — Posz Law Group, PLC

(57) ABSTRACT

A damper opening and closing device includes an outer cylinder, an inner cylinder that is disposed inside the outer cylinder, is supported movably relative to the outer cylinder and has a fluid passage therein, and a damper group that includes a plurality of dampers disposed in the fluid passage so that the fluid passage is openable and closable. The plurality of dampers are arranged in a circumferential direction of the fluid passage and disposed in the fluid passage in such a way that inner peripheral edges of the dampers are opposed to each other. The damper opening and closing device further includes an angle control unit configured to control the tilt angle of the damper in conjunction with movement of the inner cylinder relative to the outer cylinder.

18 Claims, 22 Drawing Sheets

(56) References Cited

U.S. PATENT DOCUMENTS

| | | | | |
|---|---|---|---|---|
| 5,980,379 | A | * | 11/1999 | Shibata ............... B60H 1/3407 454/127 |
| 6,016,976 | A | * | 1/2000 | Kern .................... B60H 1/3428 239/461 |
| 6,059,652 | A | | 5/2000 | Terry et al. |
| 6,176,775 | B1 | * | 1/2001 | Volk .................... B60H 1/3414 454/154 |
| 6,499,788 | B2 | * | 12/2002 | Ito ........................ B60K 35/00 296/37.12 |
| 6,889,456 | B2 | * | 5/2005 | Shibata ................. B60Q 1/323 40/544 |
| 6,893,338 | B2 | * | 5/2005 | Katagiri ............... B60H 1/3421 454/155 |
| 7,018,288 | B2 | * | 3/2006 | Okada .................. B60H 1/3421 454/155 |
| 7,056,203 | B2 | * | 6/2006 | Shibata ................. B60H 1/3428 454/155 |
| 7,229,348 | B2 | * | 6/2007 | Shibata ................. B60H 1/3421 454/155 |
| 7,435,366 | B2 | * | 10/2008 | Shibata ................. H05K 5/0243 264/259 |
| 7,566,261 | B2 | * | 7/2009 | Ono ...................... B60H 1/3421 454/143 |
| 8,602,852 | B2 | * | 12/2013 | Sawada ................ B60H 1/3428 454/143 |
| 8,661,622 | B2 | * | 3/2014 | Takai .................... B60N 3/023 16/438 |
| 8,714,290 | B2 | * | 5/2014 | Kitashiba ............. B60K 11/085 165/41 |
| 8,740,677 | B2 | * | 6/2014 | Steinbeiss ............ B60H 1/3442 454/152 |
| 9,511,718 | B2 | * | 12/2016 | Shibata ..................... B60R 7/06 |
| 9,539,882 | B2 | * | 1/2017 | Takai ................... B60H 1/3421 |
| 9,555,692 | B2 | * | 1/2017 | Shibata ................ B60H 1/3421 |
| 2004/0127153 | A1 | * | 7/2004 | Demerath ............ B60H 1/3421 454/155 |
| 2005/0202778 | A1 | * | 9/2005 | Stravitz ............... F24F 13/1413 454/353 |
| 2006/0068694 | A1 | * | 3/2006 | Tajiri .................. B60H 1/00685 454/152 |
| 2006/0172681 | A1 | * | 8/2006 | Steinbeiss ............ B60H 1/3442 454/152 |
| 2008/0171509 | A1 | * | 7/2008 | Grossmann ........ B60H 1/00871 454/155 |
| 2011/0092149 | A1 | * | 4/2011 | Spamer ................ B60H 1/3428 454/155 |
| 2011/0111685 | A1 | * | 5/2011 | Benamira ............ B60H 1/3442 454/155 |
| 2011/0195650 | A1 | * | 8/2011 | Uhlenbusch ......... B60H 1/3442 454/152 |
| 2012/0122387 | A1 | * | 5/2012 | Nicola ................. B60H 1/3428 454/155 |
| 2012/0309282 | A1 | * | 12/2012 | Norbury, Jr. ......... B60H 1/3428 454/155 |
| 2013/0059520 | A1 | * | 3/2013 | Wolf .................... B60H 1/3457 454/154 |
| 2013/0306760 | A1 | * | 11/2013 | Banschbach ............. B60H 1/34 239/503 |
| 2014/0011436 | A1 | * | 1/2014 | Kaneda ..................... B60H 1/34 454/152 |

FOREIGN PATENT DOCUMENTS

| | | |
|---|---|---|
| CN | 101726079 A | 6/2010 |
| DE | 10 2009 007 037 A1 | 8/2010 |
| DE | 10 2011 105 386 A1 | 12/2012 |
| JP | S47-42358 U | 12/1972 |
| JP | S54-95756 U | 12/1977 |
| JP | S56-102214 A | 1/1980 |
| JP | S61-192245 U | 11/1986 |
| JP | H01-144217 U | 10/1989 |
| JP | H05-027545 U | 4/1993 |
| JP | H07-180900 A | 7/1995 |
| JP | 2002-137628 A | 5/2002 |
| JP | 2002-168511 A | 6/2002 |
| JP | 2004-114799 A | 4/2004 |
| JP | 2007-153207 A | 6/2007 |
| WO | 2006/077308 A1 | 7/2006 |

OTHER PUBLICATIONS

Office Action dated Jun. 21, 2016 issued in corresponding JP patent application No. 2013-094458 (and English translation).

* cited by examiner

A-A CROSS SECTION

B-B CROSS SECTION

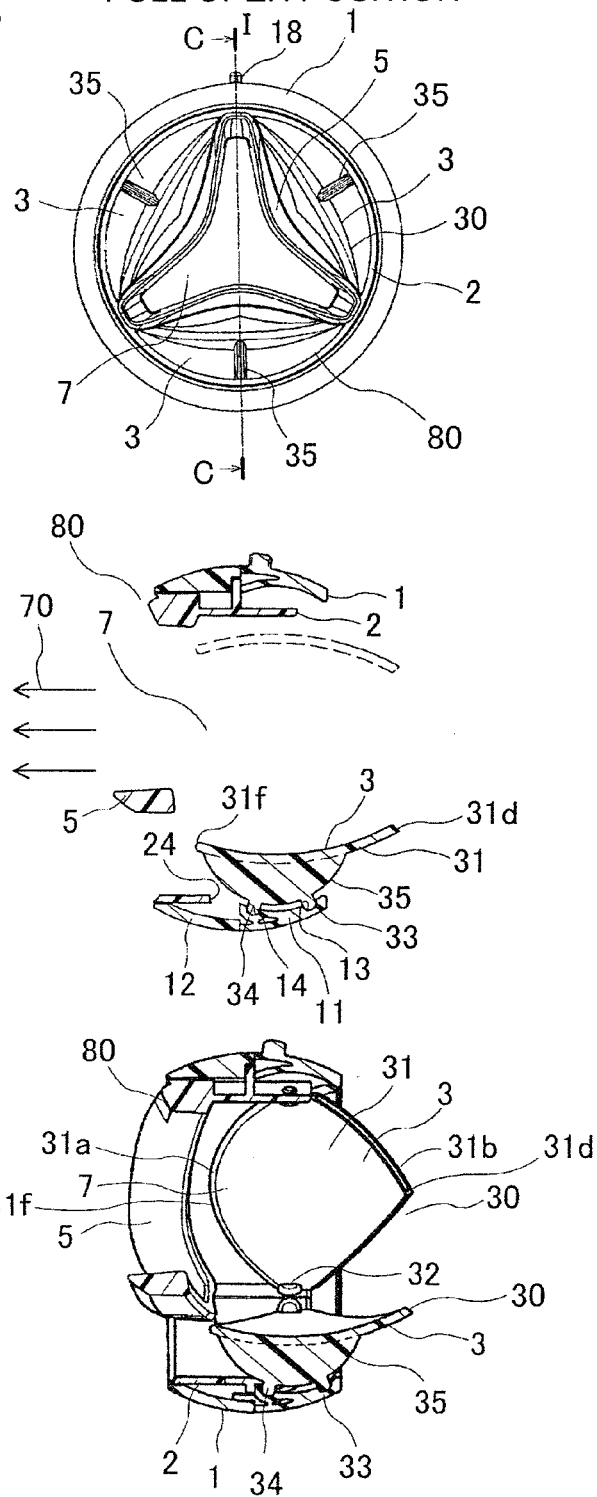
FIG. 8  FULL OPEN POSITION

FIG. 9  INTENSIVE BLOWING POSITION
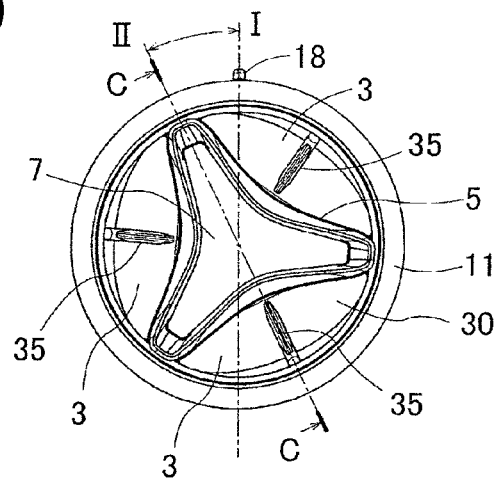
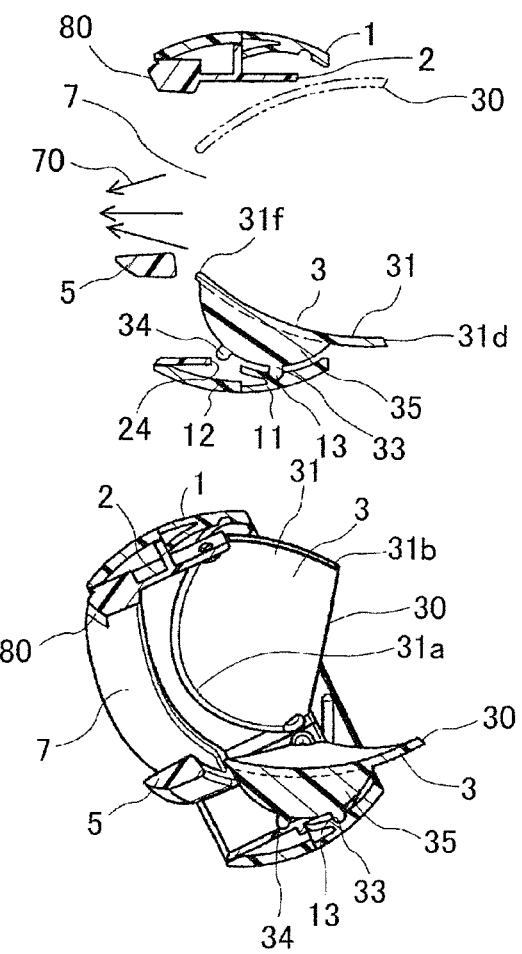

FIG. 10 DIFFUSION BLOWING POSITION
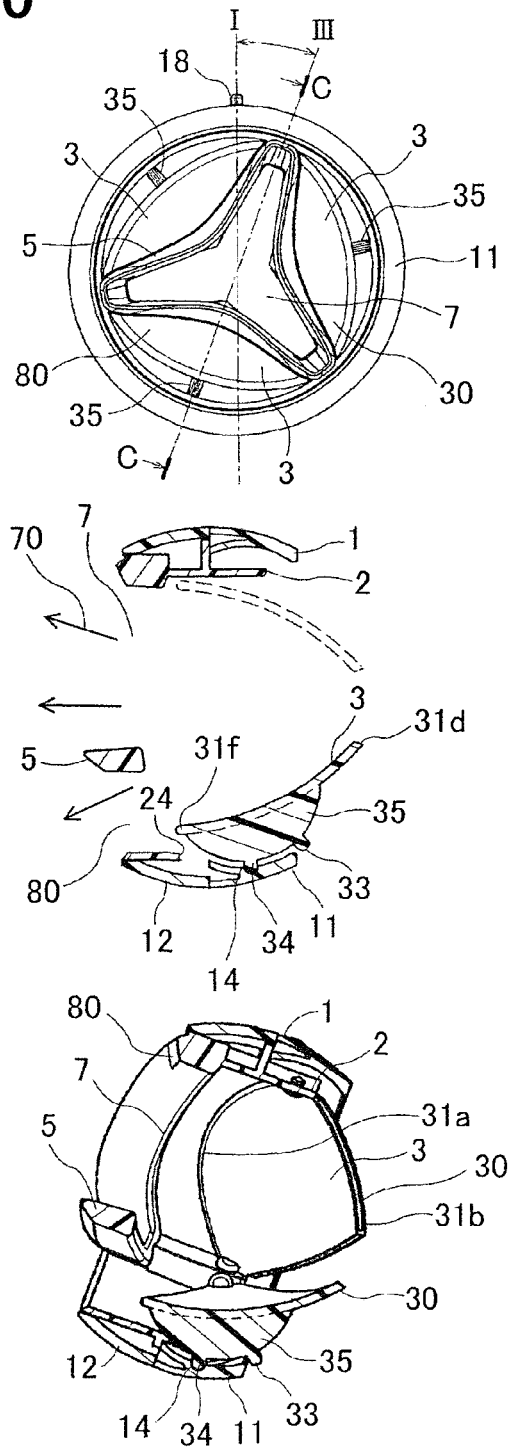

FIG. 11
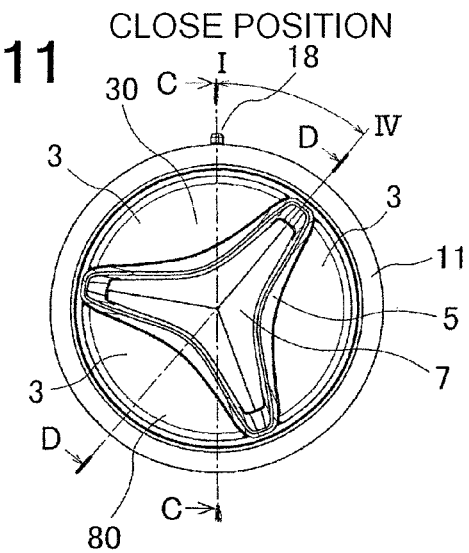
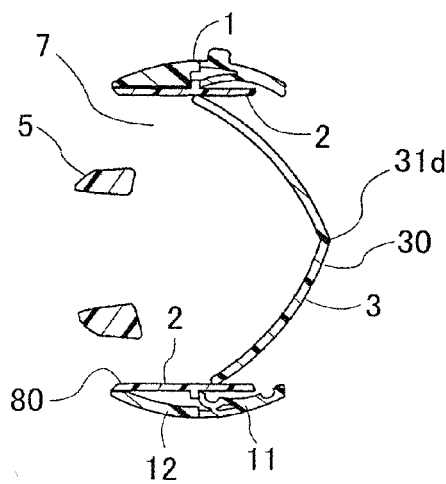
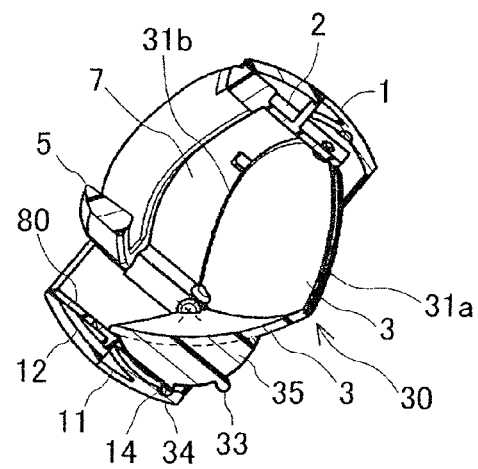

FIG. 12
FULL OPEN POSITION
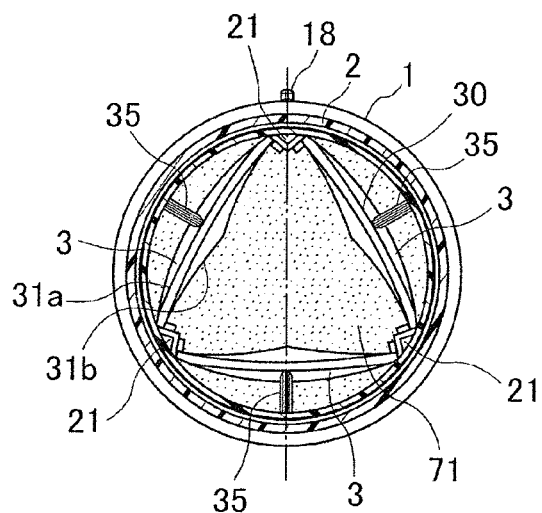
INTENSIVE BLOWING POSITION
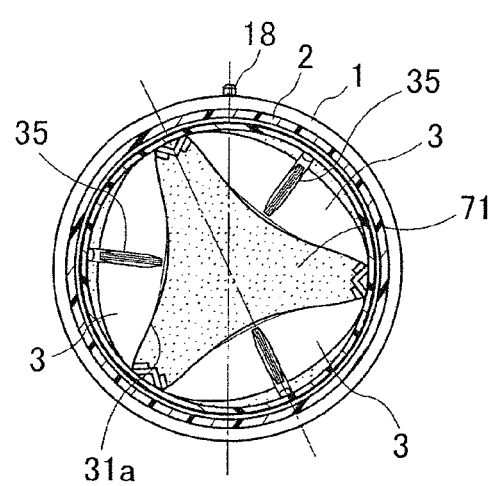
DIFFUSION BLOWING POSITION
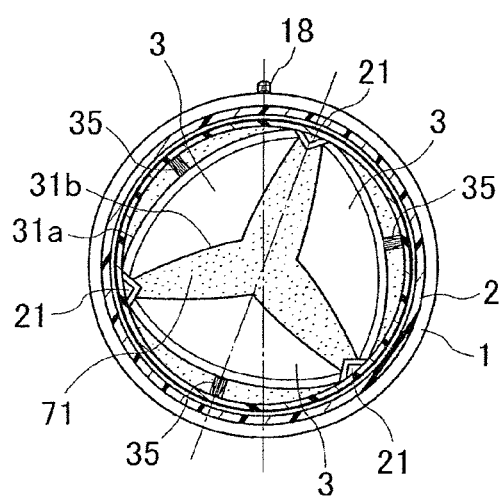
CLOSE POSITION
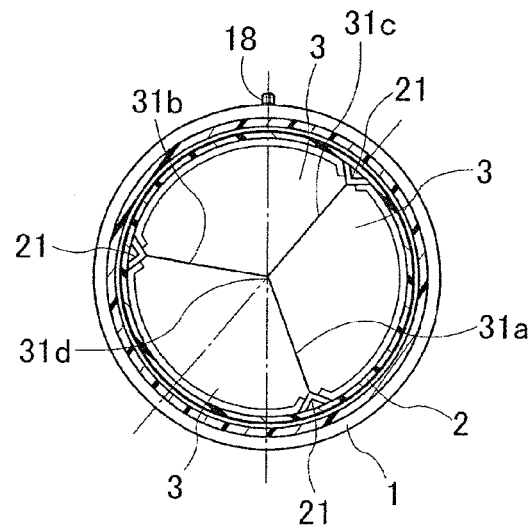

DOWNSTREAM SIDE ← → UPSTREAM SIDE
AXIAL DIRECTION

AXIAL DIRECTION
↑ DOWNSTREAM SIDE  UPSTREAM SIDE

UPSTREAM
SIDE
⟵⟶ DOWNSTREAM
SIDE

DAMPER OPENING AND CLOSING DEVICE

CROSS REFERENCE TO RELATED APPLICATION

This application is based on Japanese Patent Applications Nos. 2013-094458 filed on Apr. 26, 2013, and 2013-032316 filed on Feb. 21, 2013, the contents of which are incorporated herein by reference.

BACKGROUND OF THE INVENTION

1. Technical Field

The present invention relates to a damper opening and closing device for regulating the flow rate of fluid flowing through a fluid passage.

2. Background Art

In a related art, a damper opening and closing device is disclosed in JP-A-2002-168511. FIG. 27 of the present specification is a view corresponding to an exploded perspective view of the damper opening and closing device disclosed in JP-A-2002-168511. As shown in FIG. 27, the damper opening and closing device includes a housing 912 having a fluid passage 925 therein, an operating body 914 supported movably in the fluid passage 925 and having a rack part 944 and an operating part 946 and louvers 918. The louvers 918 are respectively provided with a pinion part 957 that meshes with the rack part 944 and are pivotably supported radially to each other by the housing 912.

In this configuration, the louver 918 is pivoted about a louver shaft 952 provided with the pinion part 957 by moving the operating body 914 back and forth using the operating part 946.

However, in JP-A-2002-168511, the rack part 944 and the operating part 946 are concentrated in an axial center of the fluid passage 925. Further, a guide body 915 and a rectification part 927 are disposed in the center of the fluid passage 925 so as to surround the operating body 914. Therefore, the pressure loss of the fluid flowing through the fluid passage is large and therefore it is difficult to blow out a sufficient amount of air.

Further, also in JP-A-2002-137628, JP-A-7-180900 and JP-UM-A-5-27545, a configuration is disclosed in which an operating part is disposed in the center of a fluid passage and the louver is opened and closed by operating the operating part.

The present invention has been made in consideration of the above circumstances and an object thereof is to provide a damper opening and closing device which is capable of reducing the pressure loss of fluid flowing through a fluid passage.

SUMMARY OF THE INVENTION (1) According to an aspect of the invention, a damper opening and closing device includes an outer cylinder, an inner cylinder that is disposed inside the outer cylinder, is supported movably relative to the outer cylinder and has a fluid passage therein, and a damper group that includes a plurality of dampers disposed in the fluid passage so that the fluid passage is openable and closable. The plurality of dampers are arranged in a circumferential direction of the fluid passage and disposed in the fluid passage in such a way that inner peripheral edges of the dampers are opposed to each other. Each of the dampers is swingably supported to the inner cylinder and an tilt angle of the damper to an axial direction of the fluid passage is changed by swinging the damper relative to the inner cylinder in order to adjust the flow amount of fluid passing through the fluid passage. The damper opening and closing device further includes an angle control unit configured to control the tilt angle of the damper in conjunction with movement of the inner cylinder relative to the outer cylinder.

With the above configuration (1), the fluid passage is opened and closed by changing the tilt angle of the damper in conjunction with movement of the inner cylinder. Therefore, it is not necessary to place a member such as an operating part in the center of the fluid passage. When the damper is positioned at an open position, the fluid in the center of the fluid passage is easily blown out and therefore it is possible to reduce the pressure loss of the fluid in the fluid passage.

(2) In the damper opening and closing device of (1), a space between outer peripheral edges of the dampers and the inner cylinder is closed and a space between the inner peripheral edge of the damper and the inner peripheral edges of other dampers is closed when the dampers are in a closed position where the tilt angle is maximized, and the space between the outer peripheral edges of the dampers and the inner cylinder is closed and the space between the inner peripheral edge of the damper and the inner peripheral edges of other dampers is closed by reducing the tilt angle of the dampers from the maximum tilt angle in the closed position.

With the above configuration (2), a space between the outer peripheral edge of the damper and the inner cylinder and a space between the inner peripheral edge of the damper and the inner peripheral edge of other dampers are closed when the damper is in the closed position. Accordingly, it is possible to stop the flowing of the fluid in the fluid passage. Further, by changing the tilt angle of the damper from the closed position, the space between the outer peripheral edge of the damper and the inner cylinder and the space between the inner peripheral edge of the damper and the inner peripheral edge of other dampers are opened. In this way, it is possible to allow the fluid in the fluid passage to flow.

(3) In the damper opening and closing device of (1) or (2), the inner peripheral edge of the damper is disposed on the upstream side of the fluid passage and the outer peripheral edge of the damper is disposed on the downstream side of the fluid passage.

When the damper is in the closed position, the inner peripheral edge of the damper is disposed on the upstream side of the outer peripheral surface in the fluid passage. For this reason, the damper is less likely to be visible through the outlet on the downstream side of the fluid passage and thus, appearance of the damper opening and closing device is improved.

(4) In the damper opening and closing device of (3), the damper has a diffusion blowing position where an opening area of the outer peripheral edge disposed on the downstream side of the damper is larger than an opening area of the inner peripheral edge disposed on the upstream side of the damper.

When fluid flows from the upstream side to the downstream side of the fluid passage, the fluid is diffused toward the opening of the outer peripheral edge disposed on the downstream side of the damper from the opening of the inner peripheral edge disposed on the upstream side of the damper. Therefore, it is possible to blow out diffused wind through the outlet of the fluid passage.

(5) In the damper opening and closing device of (3) or (4), the damper has an intensive blowing position where an opening area of the outer peripheral edge disposed on the downstream side of the damper is smaller than an opening area of the inner peripheral edge disposed on the upstream side of the damper.

When fluid flows from the upstream side to the downstream side of the fluid passage, the fluid is concentrated toward the opening of the outer peripheral edge disposed on the downstream side of the damper from the opening of the inner peripheral edge disposed on the upstream side of the damper. Therefore, it is possible to blow out intensive wind through the outlet of the fluid passage.

(6) In the damper opening and closing device of any one (1) to (5), the inner cylinder includes a plural sets of paired bearing portions that are provided in an inner peripheral surface and disposed in positions spaced in the circumferential direction, and each of the dampers includes a pair of support parts that is pivotally supported to each of the paired bearing portion of the inner cylinder, the outer peripheral edge of each damper is formed radially outward of the support parts in between the pair of support parts and the inner peripheral edge of each damper is formed radially inward of the support parts in between the pair of support parts.

In this case, the damper is swingably supported to the inner cylinder and the fluid passage can be freely opened and closed by the swinging of the damper.

(7) In the damper opening and closing device of (6), a plurality of bearing portions is arranged at positions that are located at equal intervals in the circumferential direction of the inner cylinder and each damper is swung while using, as a pivot axis, a chord connecting linearly respective bearing portions.

In the configuration (7), it is possible to smoothly open and close the whole fluid passage by the damper with a simple configuration.

(8) In the damper opening and closing device of any one of (1) to (7), the inner cylinder is pivoted in the circumferential direction with respect to the outer cylinder and the angle control unit adjusts the tilt angle of the damper in conjunction with the pivoting of the inner cylinder.

With the configuration (8), the tilt angle of the damper is changed by pivoting the inner cylinder relative to the outer cylinder and therefore it is possible to open and close the fluid passage.

(9) In the damper opening and closing device of (8), the angle control unit includes a protrusion protruded from an outer surface of the damper and a guide groove that is formed in an inner peripheral surface of the outer cylinder and causes the protrusion to move axially in conjunction with the pivoting of the inner cylinder.

When the inner cylinder is pivoted relative to the outer cylinder, the protrusions of the damper move in the axial direction of the fluid passage along the guide grooves formed in the outer cylinder. In this way, the tilt angle of the damper to the axial direction is changed and thus, it is possible to open and close the fluid passage.

Here, it is desirable that the guide groove has a helical shape. The pivoting of the outer cylinder relative to the inner cylinder can be changed by the axial movement of the damper supported to the inner cylinder.

Preferably, a plurality of protrusions are protruded from the outer surface of each damper and a plurality of guide grooves are formed in the positions that are located in the inner peripheral surface of the outer cylinder and opposed to the plurality of protrusions. In this case, any one of the protrusions is guided by the guide groove and therefore it is possible to increase the whole moving distance of the protrusion even when the groove length of each guide groove is short.

(10) In the damper opening and closing device of (8), the angle control unit includes a pinion protruded from an outer surface of the damper and a rack that is formed in an inner peripheral surface of the outer cylinder and meshed with the pinion.

The rack formed in the inner peripheral surface of the outer cylinder meshes with the pinion protruded from the outer surface of the damper. Accordingly, it is possible to accurately change the tilt angle of the damper according to the movement amount of the outer cylinder relative to the inner cylinder.

(11) The damper opening and closing device of any one of (1) to (10) further includes a cylindrical retainer that integrally and rotatably accommodates a main body including the outer cylinder, the inner cylinder and the damper group, and a connection support part that is fixed to the retainer and positioned in the axial center of the retainer to pivotably support the main body.

According to the above configuration (11), the main body of the damper opening and closing device can be freely pivoted relative to the retainer around the connection support part. With the pivoting of the retainer, the damper group can be pivoted relative to the retainer.

(12) The damper opening and closing device of (11) further includes a main body support part that is fixed to the inner cylinder, positioned in the axial center of the inner cylinder and pivotably supported to the connection support part.

The damper is swingably supported to the inner cylinder. Therefore, the inner cylinder is pivoted relative to the retainer by pivotably supporting the main body support part to the connection support part. With the pivoting of the inner cylinder, the damper group can be pivoted relative to the retainer.

(13) In the damper opening and closing device of (12), the connection support part is fixed to the retainer by being connected to a first rib extending radially inward from the retainer and the main body support part is fixed to the inner cylinder by being connected to a second rib extending radially inward from the inner cylinder.

The connection support part and the main body support part are positioned in the fluid passage formed inside the inner cylinder. The connection support part is connected to the retainer by the first rib and the main body support part is connected to the inner cylinder by the second rib. Thereby, it is possible to widen the opening region of the radial cross section of the fluid passage and therefore it is possible to prevent the pressure loss of the fluid.

(14) In the damper opening and closing device of any one of (11) to (13), the inner peripheral edge of the damper is disposed on the downstream side of the outer peripheral edge of the damper and the connection support part is disposed on the upstream side of the damper.

A hand is prevented from being pinched between the damper during swinging and the inner cylinder when a hand is inserted through the outlet on the downstream side and therefore the hindrance for the opening and closing of the damper can be prevented.

(15) In the damper opening and closing device of any one of (11) to (14), one of the connection support part and the main body support part has a ball portion at a leading end thereof and the other of the connection support part and the main body support part has a sliding portion in which the ball portion is pivotably slid.

By sliding the sliding portion relative to the ball portion, the inner cylinder is pivoted relative to the retainer. The damper group held in the inner cylinder and the outer cylinder holding the inner cylinder can be smoothly pivoted and tilted in all directions.

According to the damper opening and closing device of the present invention, the damper is swingably supported to the inner cylinder and the inner cylinder is moved relative to the outer cylinder, so that the tilt angle of the damper is changed in conjunction with the movement of the inner cylinder and thus, the fluid passage is opened and closed. Therefore, it is possible to reduce the pressure loss of the fluid flowing through the fluid passage.

BRIEF DESCRIPTION OF THE DRAWINGS

FIG. 8 shows the damper opening and closing device when the damper is in a full open position, an upper figure of FIG. 8 is a plan view of the damper opening and closing device, a middle figure of FIG. 8 is a sectional view taken along an arrow C-C in the upper figure of FIG. 8 and a lower figure of FIG. 8 is a sectional perspective view taken along the arrow C-C in the upper figure of FIG. 8.

FIG. 9 shows the damper opening and closing device when the damper is in an intensive blowing position, an upper figure of FIG. 9 is a plan view of the damper opening and closing device, a middle figure of FIG. 9 is a sectional view taken along an arrow C-C in the upper figure of FIG. 9 and a lower figure of FIG. 9 is a sectional perspective view taken along the arrow C-C in the upper figure of FIG. 9.

FIG. 10 shows the damper opening and closing device when the damper is in a diffusion blowing position, an upper figure of FIG. 10 is a plan view of the damper opening and closing device, a middle figure of FIG. 10 is a sectional view taken along an arrow C-C in the upper figure of FIG. 10 and a lower figure of FIG. 10 is a sectional perspective view taken along the arrow C-C in the upper figure of FIG. 10.

FIG. 11 shows the damper opening and closing device when the damper is in a closed position, an upper figure of FIG. 11 is a plan view of the damper opening and closing device, a middle figure of FIG. 11 is a sectional view taken along an arrow C-C in the upper figure of FIG. 11 and a lower figure of FIG. 11 is a sectional perspective view taken along the arrow D-D in the upper figure of FIG. 11.

FIG. 12 is a radial sectional view of the damper opening and closing device for indicating an opening area of the fluid passage in the first embodiment and an upper left figure, an upper right figure, a lower left figure and a lower right figure of FIG. 12, respectively, show the states of the damper opening and closing device when the damper is in the full open position, the intensive blowing position, the diffusion blowing position and the closed position.

FIG. 26A shows a second rib having an elongated rectangular shape and including an inclined surface, FIG. 26B shows a second rib having a triangular cross-section, FIG. 26C shows a case of forming a stepped portion on a straight portion of the damper main body and FIG. 26D shows a second rib having a diamond-shaped cross-section.

DESCRIPTION OF PREFERRED EMBODIMENT

First Embodiment

A damper opening and closing device according to the present first embodiment will be described with reference to the accompanying drawings.

Figure 1:
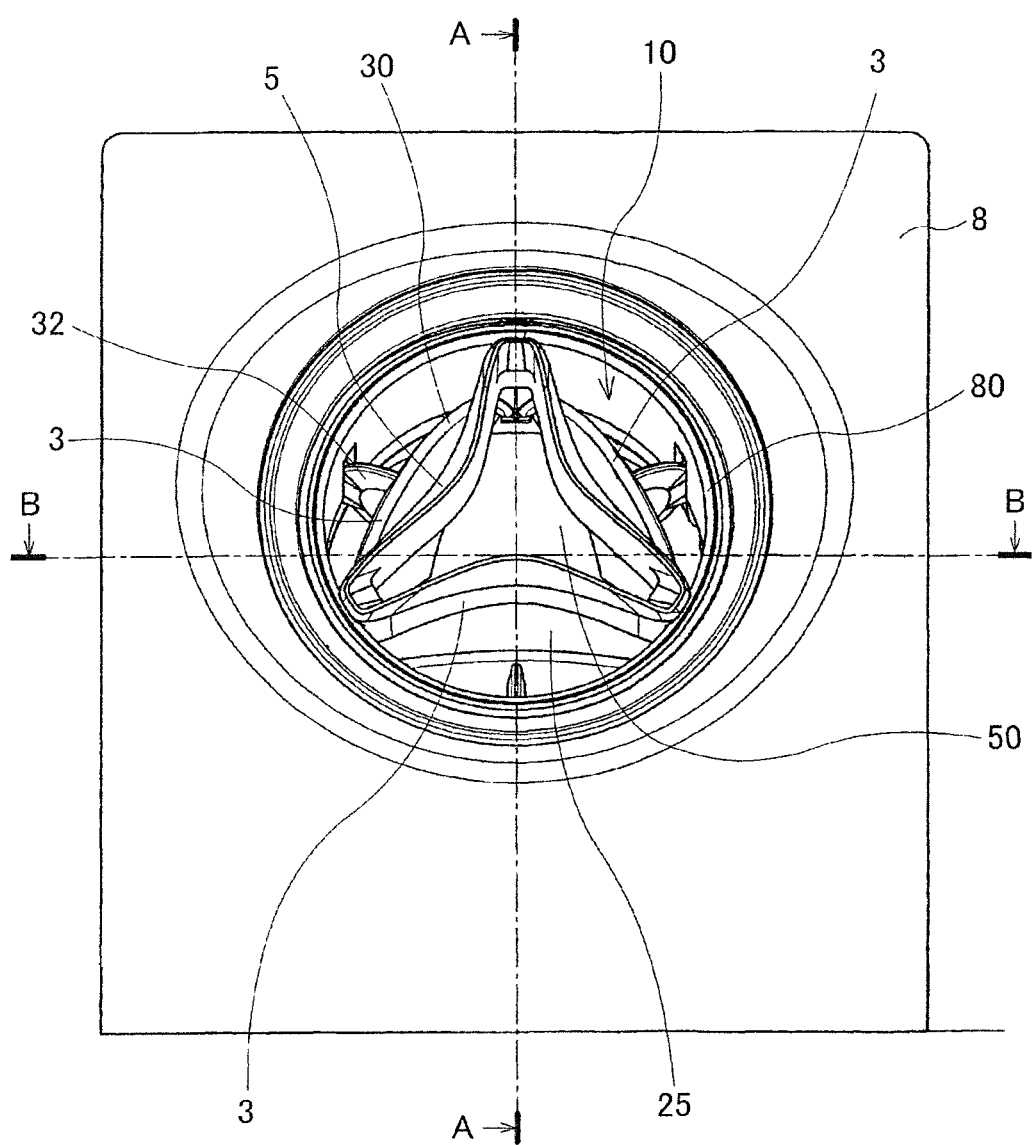
FIG. 1 is a plan view showing the periphery of an outlet of an instrument panel of a vehicle in a first embodiment.

FIG. 1 is a plan view showing the periphery of an outlet 80 of an instrument panel 8 of a vehicle. As shown in FIG. 1, a damper opening and closing device 10 according to the present first embodiment is provided in the outlet 80 of the instrument panel 8 of a vehicle. The damper opening and closing device 10 includes a main body 25 and a retainer 6 for pivotably holding the main body 25 therein. The main body 25 includes an outer cylinder 1, an inner cylinder 2, a damper group 30 consisting of a plurality of dampers 3 and an operating part 5.

Figure 2:
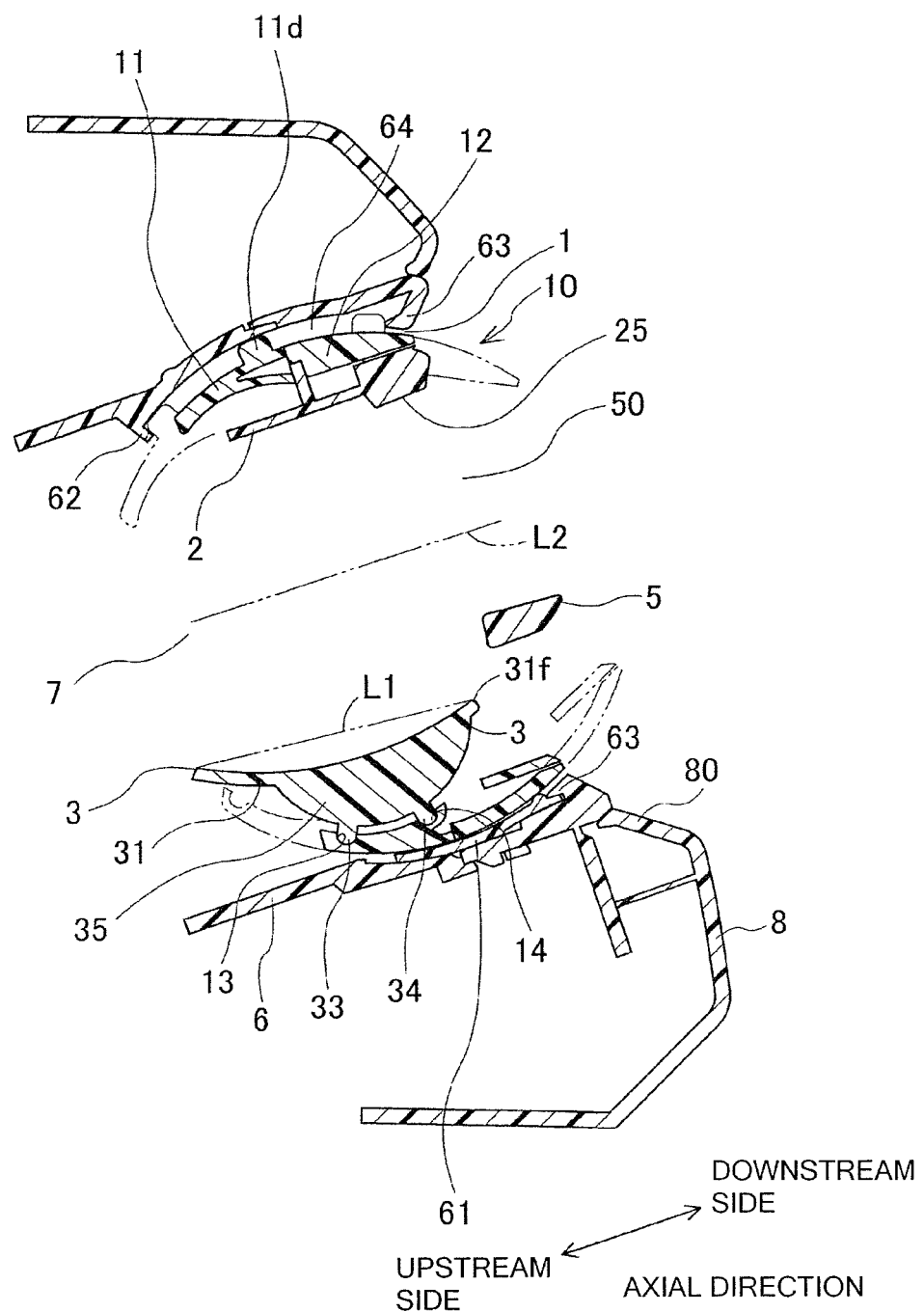
FIG. 2 is a sectional view taken along an arrow A-A in FIG. 1.
Figure 3:
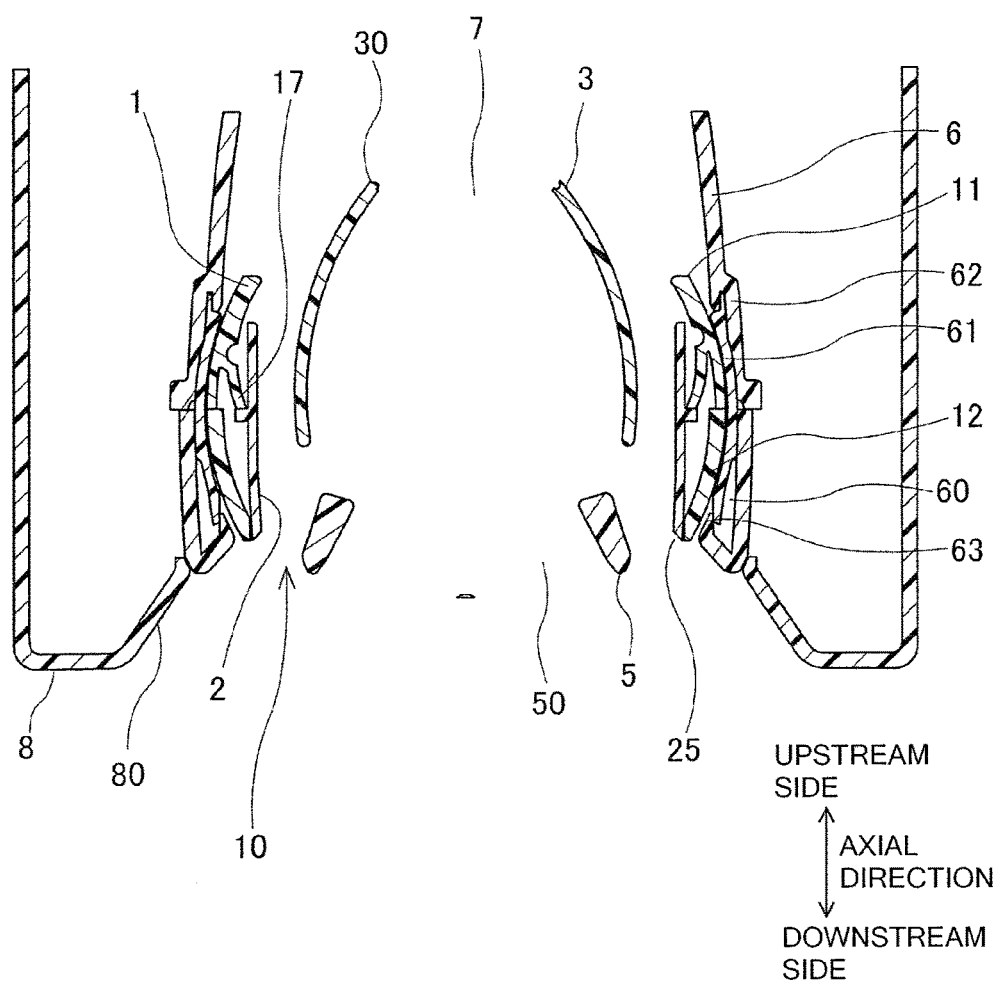
FIG. 3 is a sectional view taken along an arrow B-B in FIG. 1.
Figure 4:
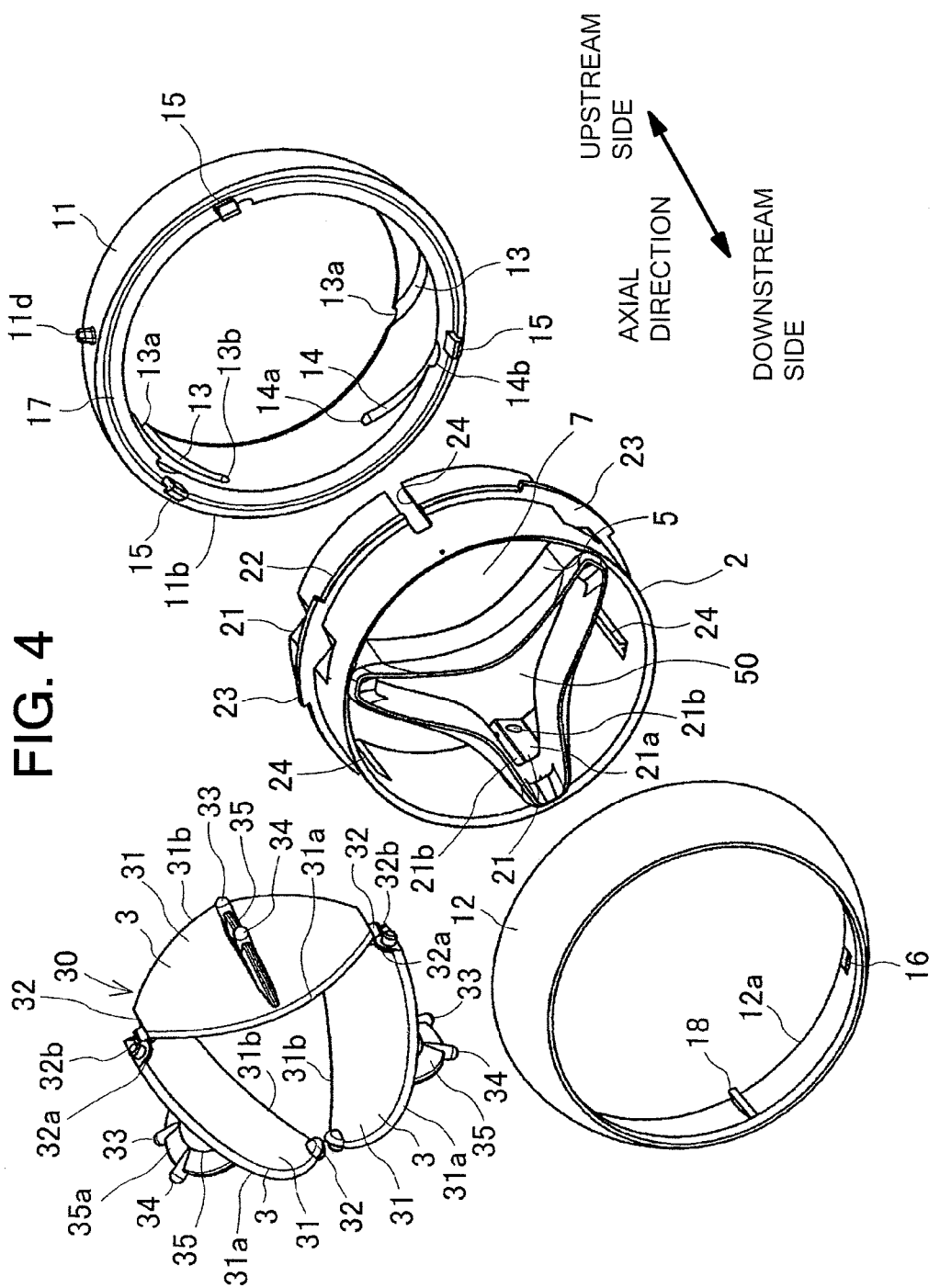
FIG. 4 is an exploded perspective view of a damper opening and closing device according to the first embodiment.

FIG. 2 is a sectional view taken along an arrow A-A in FIG. 1 and FIG. 3 is a sectional view taken along an arrow B-B in FIG. 1. FIG. 4 is an exploded perspective view of the damper opening and closing device 10. As shown in FIG. 2, the outlet 80 for conditioned air is opened in the instrument panel 8. The retainer 6 is fixed to a peripheral edge of the outlet 80. A shim 61 is disposed in an inner surface of the retainer 6. An upstream side end portion of the shim 61 is engaged with an engaging groove 62 that is formed in the retainer 6. A minute space 60 is formed between a downstream side of the shim 61 and the inner surface of the retainer 6. A downstream side end portion of the shim 61 is engaged with an outer surface of an engaging claw 63 that is formed in a state of being bent radially inward from a downstream side end portion of the retainer 6. Thereby, the shim 61 is fixed to the retainer 6 so that the downstream side thereof can be elastically deformed toward the minute space 60.

As shown in FIG. 2 and FIG. 3, the inner surface of the shim 61 has a spherical shape and the main body 25 of the damper opening and closing device 10 is held in the inner surface so as to be pivotable in any direction. The outer cylinder 1 of the damper opening and closing device 10 includes a first member 11 disposed in an upstream side and a second member 12 disposed in a downstream side closer to the outlet 80 than the first member 11.

As shown in FIG. 4, three engaging protrusions 15 are protruded from three sites of a downstream side peripheral edge 11b of the first member 11 and three engaging recesses 16 are formed on three sites of an upstream side peripheral edge 12a of the second member 12. The engaging protrusion 15 is engaged with the engaging recess 16. In this way, the first member 11 and the second member 12 are integrally fixed to each other. Each of the first member 11 and the second member 12 has a cylindrical shape and internal spaces thereof have the same center axis.

An outer peripheral surface of the first member 11 and an outer peripheral surface of the second member 12 are continuous to form a spherical shape and the dampers 3 are held in the inner surface of the spherical shape so as to be pivotable and tiltable in any direction. As shown in FIG. 2, a protrusion 11d is formed in an outer peripheral surface of the first member 11. The protrusion 11d is projected toward the retainer 6 through a window that is formed by cutting out a portion in a circumferential direction of the shim 61. The protrusion 11d supports the main body 25 of the damper opening and closing device 10 in any direction by being moved along a guide 64 formed in the retainer 6. Since movement of the protrusion 11d is restricted by the engaging groove 62 and the engaging claw 63, which are provided at both ends of the guide 64, the tilting of the main body 25 of the damper opening and closing device 10 to the axial direction of the retainer 6 is restricted.

Figure 5:
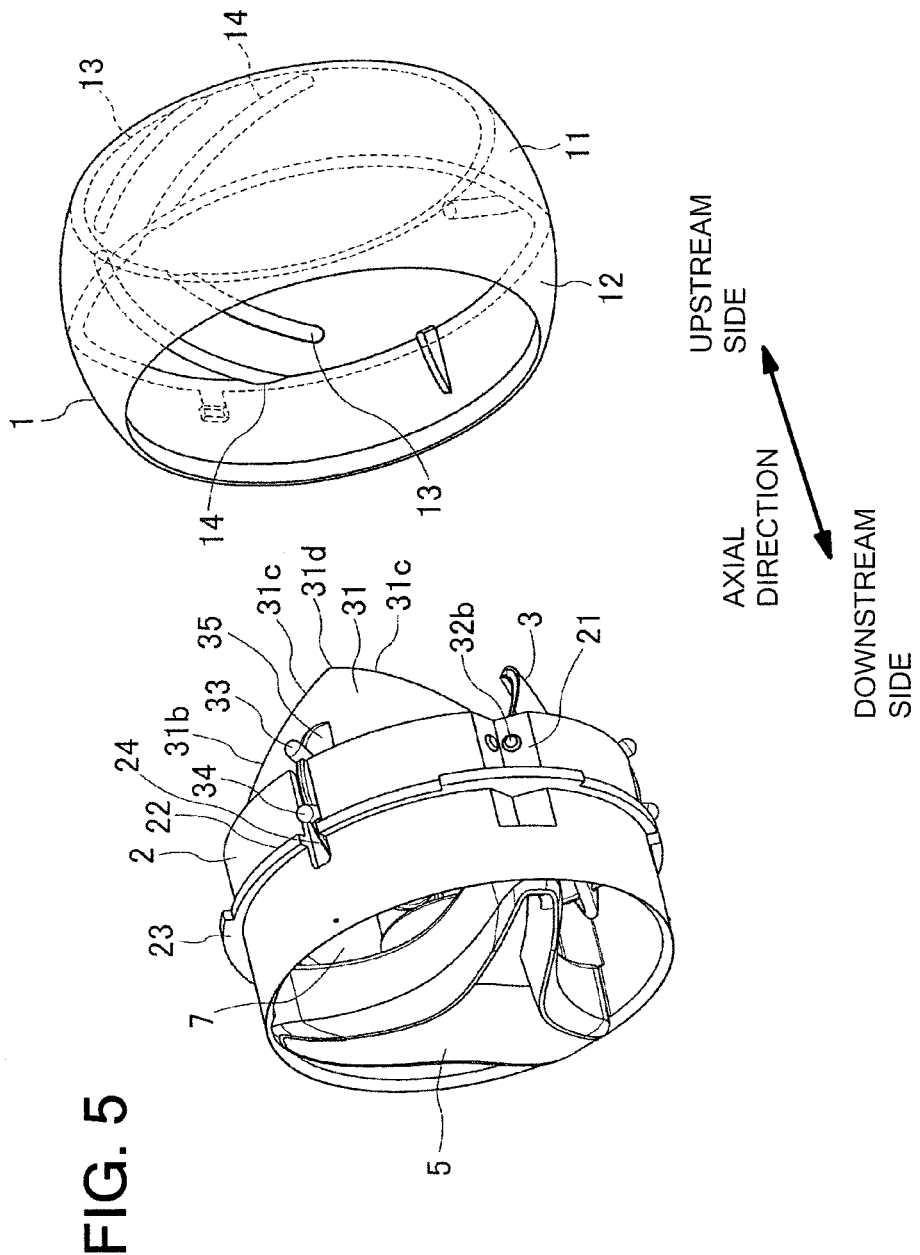
FIG. 5 is a perspective view of an inner cylinder that supports a damper and an outer cylinder in the first embodiment.
Figure 6:
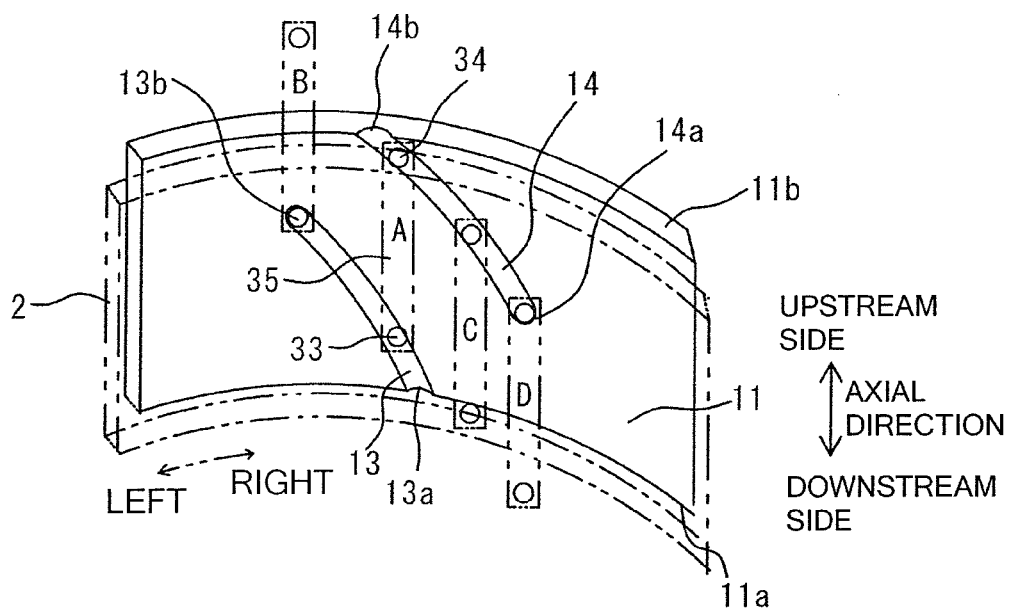
FIG. 6 is an explanatory view showing a positional relationship between protrusions of the damper and the outer cylinder in the first embodiment.

FIG. 5 is a perspective view of the inner cylinder 2 that supports the damper 3 and the outer cylinder 1. FIG. 6 is an explanatory view showing a positional relationship between a semicircular part 35 of the damper 3 and the outer cylinder 1. As shown in FIG. 5 and FIG. 6, first and second guide grooves 13, 14 are recessed in an inner peripheral surface of the first member 11 of the outer cylinder 1. Both of the first and second guide grooves 13, 14 have a mutually parallel helical shape and are inclined toward the downstream side with respect to the right side of the circumferential direction. When two first and second guide grooves 13, 14 are defined as a set, three sets of first and second guide grooves 13, 14 are formed at equal intervals in the circumferential direction on an inner peripheral surface of the first member 11.

The first guide groove 13 is located on an upstream side of the second guide groove 14. An upstream side end portion 13a of the first guide groove 13 is located on an upstream side peripheral edge 11a of the first member 11. A downstream side end portion 13b of the first guide groove 13 is located in the middle portion of an inner peripheral surface of the first member 11. An upstream side end portion 14a of the second guide groove 14 is located in the middle portion of the inner peripheral surface of the first member 11 and a downstream side end portion 14b of the second guide groove 14 is located on the downstream side peripheral edge 11b of the first member 11. A downstream side portion of the first guide groove 13 and an upstream side portion of the second guide groove 14 are overlapped with each other in a circumferential direction.

As shown in FIG. 4, the inner cylinder 2 has a cylindrical shape with the same axis as the outer cylinder 1. A flange part 22 is formed at an axial central portion of the inner cylinder 2 and protruded radially outward. The flange part 22 is sandwiched between a ring-shaped holding piece 17 and a plurality of ribs 18. The ring-shaped holding piece 17 is branched radially inward at a downstream side portion of the first member 11. The ribs 18 are protruded in a circumferential direction on an upstream side portion of the inner peripheral surface of the second member 12. Since the flange part 22 is sandwiched between the first member 11 and the second member 12 in this way, the inner cylinder 2 is held pivotably in a circumferential direction relative to the outer cylinder 1.

Convex portions 21 are formed in the inner cylinder 2 and protruded radially inward in a triangular shape. Three convex portions 21 are formed in three sites at intervals of 120° in the circumferential direction of the inner cylinder 2. Each convex portion 21 includes a pair of inclined surfaces 21a that are connected to each other across an apex. Each inclined surface 21a is respectively formed with a hole as a bearing portion 21b.

A wide portion 23 is formed in the vicinity of the convex portion 21 of the flange part 22 of the inner cylinder 2 and protruded radially outward. The wide portion 23 can be pivotable between the adjacent engaging protrusions 15 of a plurality of engaging protrusions 15 protruded to the downstream side end portion 11b of the first member 11 of the outer cylinder 1. The adjacent engaging protrusions 15 are positioned at both ends of the rotation trajectory of the wide portion 23 and restrict the pivoting of the wide portion 23 when being abutted against an end portion of the wide portion 23. Since the wide portion 23 is pivoted between the adjacent engaging protrusions 15, the pivotable angle of the inner cylinder 2 to the outer cylinder 1 is defined. In the present embodiment, the pivotable angle of the inner cylinder 2 to the outer cylinder 1 is 65°.

A slit 24 is formed on the upstream side portion of the inner cylinder 2. The slit 24 is extended in an axial direction of the inner cylinder 2. The slit 24 has one end opened toward an upstream side peripheral edge and the other end positioned at a substantially central portion in an axial direction of the inner cylinder 2. Three slits 24 are formed in three sites at intervals of 120° in the circumferential direction of the inner cylinder 2. These slits 24 are formed between two convex portions 21 which are adjacent to each other in the circumferential direction of the inner cylinder 2.

The operating part 5 is configured by a thin plate having a substantially triangular frame shape that is extended in an axial direction of a fluid passage 7. A space 50 through which fluid can flow is formed in the inside of the operating part 5. Each apex of the operating part 5 having the triangular frame shape is integrally fixed to a downstream side inner peripheral surface of the inner cylinder 2.

The damper group 30 is disposed in the fluid passage 7 which is formed inside the inner cylinder 2. The damper group 30 is composed of three dampers 3. Each damper 3 is supported swingably relative to the inner cylinder 2. By swinging of the damper 3 relative to the inner cylinder 2, a tilt angle of the damper 3 to an axial direction of the fluid passage 7 is adjusted.

Three dampers 3 have the same structure as each other. Each damper 3 includes a damper main body 31 having a substantially fan-like shape, a pair of support parts 32 provided at both ends in the circumferential direction of the damper main body 31 and first and second protrusions 33, 34 provided in an outer surface of the damper main body 31. The support part 32 includes a folded-back portion 32a that is folded back inward from the damper main body 31 and a shaft portion 32b that is protruded to an outer surface of the folded-back portion 32a. The shaft portion 32b is pivotably fitted into the bearing portion 21b that is formed in the inclined surface 21a of the convex portion 21 of the inner cylinder 2. Since the shaft portion 32b is pivotably fitted into the bearing portion 21b, the damper 3 are held swingably relative to the inner cylinder 2.

Figure 7:
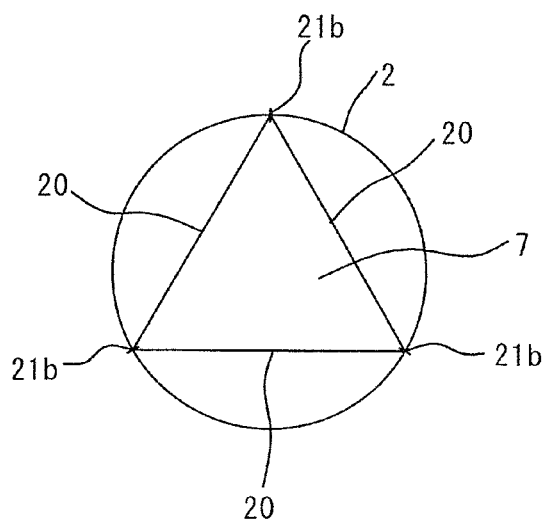
FIG. 7 is a sectional explanatory view of the fluid passage for indicating a swing center of the damper.

FIG. 7 is an explanatory view for indicating the position of a swing center of the damper. As shown in FIG. 7, a plurality of bearing portions 21b is arranged at positions that are located at equal intervals in the circumferential direction of the inner cylinder 2. Each damper 3 is swung relative to the inner cylinder 2 while using, as a pivot axis, a chord 20 connecting linearly respective bearing portions 21 adjacent to each other. Since the damper 3 is swung relative to the inner cylinder 2, the tilt angle of the damper 3 to the axial direction of the fluid passage 7 is changed and therefore the amount of conditioned air flowing through the fluid passage 7 is regulated.

As shown in FIG. 4, the damper main body 31 is disposed swingably at a predetermined angle relative to an axial direction. An inner surface of the damper main body 31 is oriented radially inward of the fluid passage 7 and an outer surface of the damper main body 31 is oriented radially outward of the fluid passage 7. Further, toward the center in the axial direction from both ends in the axial direction, the damper main body 31 has a shape that is entirely smoothly curved radially outward.

The damper main body 31 is surrounded by an outer peripheral edge 31a and an inner peripheral edge 31b. The outer peripheral edge 31a is located between a pair of support parts 32 and formed on the outside of the support parts 32. The inner peripheral edge 31b is located between a pair of support parts 32 and formed on the inside of the support parts 32.

The outer peripheral edge 31a of the damper main body 31 has a circular-arc shape. The outer peripheral edge 31a of the damper main body 31 is located in the downstream side of the damper 3 and faces an inner peripheral surface of the inner cylinder 2. As shown in a lower figure of FIG. 11 (to be described later), since the outer peripheral edge 31a of the damper main body 31 comes into slant contact with the inner peripheral surface of the inner cylinder 2 when the damper 3 is in a closed position, the outer peripheral edge 31a draws a circular arc smoother than the inner peripheral surface of the inner cylinder 2. As the tilt angle of the damper main body 31 to the axial direction of the fluid passage 7 is changed, the space between the outer peripheral edge 31a of the damper main body 31 and the inner cylinder 2 is opened and closed.

As shown in FIG. 4 and FIG. 5, the inner peripheral edge 31b of the damper main body 31 is located in the upstream side of the damper 3 and opposed to the inner peripheral edge 31b of the damper main body 31 of other dampers 3. The inner peripheral edge 31b of the damper main body 31 includes a pair of straight portions 31c extending linearly from each support part 32 at both ends thereof and an apex 31d at which the pair of straight portions 31c intersects each other. As the tilt angle of the damper main body 31 to the axial direction of the fluid passage 7 is changed, the space between the damper 3 and other dampers 3 adjacent thereto is opened and closed. Here, the tilt angle refers to an angle that is formed by a line L1 and a center axis L2 of the fluid passage 7, as shown in FIG. 2 and FIG. 8 (to be described later). The line L1 connects a central portion 31f of the outer peripheral edge 31a of the damper main body 31 with the apex 31d that is a central portion of the inner peripheral edge 31b of the damper main body 31.

The semicircular part 35 having a substantially semicircular disc shape is protruded from an outer surface of the damper main body 31. Both ends of a circular arc-shaped edge 35a of the semicircular part 35 are disposed on the upstream side and downstream side in the axial direction of the fluid passage 7. The first protrusion 33 and the second protrusion 34 are provided on the edge 35a of the semicircular part 35 and protruded radially outward of the semicircular part 35. The first protrusion 33 is located on the upstream side in the axial direction of the fluid passage 7 than the second protrusion 34.

As shown in FIG. 5, the semicircular part 35 of the damper 3 is inserted through the slit 24 of the inner cylinder 2. As shown in FIG. 6, the first and second protrusions 33, 34 protruded from the semicircular part 35 of the damper 3 are respectively fitted into the first and second guide grooves 13, 14 of the outer cylinder 1. The first and second protrusions 33, 34 can be respectively moved in the first and second guide grooves 13, 14. When the outer cylinder 1 is rotated relative to the inner cylinder 1, the first and second protrusions 33, 34 of the damper 3 held in the inner cylinder 2 are moved along the first and second guide grooves 13, 14 of the outer cylinder 1, respectively.

As shown in FIG. 4 and FIG. 6, the first and second guide grooves 13, 14 have a mutually parallel helical shape. When the first and second protrusions 33, 34 are moved in the first and second guide grooves 13, 14 by the rotational movement in the circumferential direction of the outer cylinder 1, the axial positions of the first and second protrusions 33, 34 are changed. Since the axial positions of the first and second protrusions 33, 34 relative to the shaft portion 32b of the damper 3 are changed, the damper 3 are swung around the shaft portion 32b. As the first and second protrusions 33, 34 are moved to the upstream side, the inner peripheral edge 31b of the damper main body 31 is moved radially outward and the outer peripheral edge 31a of the damper main body 31 is moved radially inward. As the first and second protrusions 33, 34 are moved to the downstream side, the inner peripheral edge 31b of the damper main body 31 is moved radially inward and the outer peripheral edge 31a of the damper main body 31 is moved radially outward. In this way, the first and second guide grooves 13, 14 axially moves the first and second protrusions 33, 34 in conjunction with the pivoting of the inner cylinder 2. The first and second protrusions 33, 34 and the first and second guide grooves 13, 14 configure an angle control means that controls the tilt angle of the damper 3 in conjunction with the movement of the inner cylinder 2 relative to the outer cylinder 1.

As shown in FIG. 6, when the inner cylinder 2 is positioned in the middle of a rotation acceptance angle range for the outer cylinder 1, the first and second protrusions 33, 34 are fitted into the first and second guide grooves 13, 14. When the inner cylinder 2 is positioned in both ends of the rotation acceptance angle range for the outer cylinder 1, one of the first and second protrusions 33, 34 is separated from one of the first and second guide grooves 13, 14 and the other of the first and second protrusions 33, 34 is fitted into the other of the first and second guide grooves 13, 14 whereby the position of the semicircular part 35 to the outer cylinder 1 is controlled. By using two first and second protrusions 33, 34 and two first and second guide grooves 13, 14, it is possible to increase the guiding length for the protrusion even when the length of each guide groove is short.

Next, an operation of the damper opening and closing device is described. FIG. 8 shows the damper opening and closing device when the damper 3 is in a full open position, FIG. 9 shows the damper opening and closing device when the damper 3 is in an intensive blowing position, FIG. 10 shows the damper opening and closing device when the damper 3 is in a diffusion blowing position and FIG. 11 shows the damper opening and closing device when the damper is in a closed position. In each of FIG. 8 to FIG. 11, an upper figure is a plan view of the damper opening and closing device, a middle figure is a sectional view taken along an arrow C-C in the upper figure and a lower figure is a sectional perspective view taken along the arrow C-C in the upper figure. Here, the lower figure of FIG. 11 is a sectional perspective view taken along an arrow D-D in the upper figure. FIG. 12 is a radial sectional view of the damper opening and closing device for indicating an opening area of the fluid passage 7 and an upper left figure, an upper right figure, a lower left figure and a lower right figure thereof, respectively, show the states of the damper opening and closing device when the damper 3 is in the full open position, the intensive blowing position, the diffusion blowing position and the closed position. The dotted-portion in FIG. 12 shows an opening region when the damper opening and closing device is axially projected.

As shown in FIG. 8, when the operating part 5 is set in a basic position I, the damper main body 31 is oriented substantially parallel to the axial direction of the fluid passage 7. The outer peripheral edge 31*a* of the damper main body 31 is spaced apart from the inner peripheral surface of the inner cylinder 2 and the inner peripheral edge 31*b* of the damper main body 31 is spaced apart from the inner peripheral surface of the damper main body 31 of other dampers 3. The outer peripheral edge 31*a* of the damper main body 31 is spaced apart from the center axis of the fluid passage 7 to the same extent as the inner peripheral edge 31*b*. The central portion 31*f* as a lower end portion of the outer peripheral edge 31*a* and the apex 31*d* as an upper end portion of the inner peripheral edge 31 are located in the same degree position in the radial direction of the fluid passage 7. At this time, as shown in the upper left figure of FIG. 12, the opening area of an opening region 71 of the fluid passage 7 penetrated from the upstream side to the downstream side is maximized when the fluid passage 7 is projected from the axial direction. At this time, the damper 3 is located in a full open position. The conditioned air 70 flows to the downstream side in the axial direction of the fluid passage 7, so that the conditioned air is blown out substantially parallel to the axial direction from the outlet 80.

As shown in FIG. 9, the operating part 5 is rotated to a second position II that is displaced from the basic position I by an angle of 25° in the counter-clockwise direction on the paper sheet of FIG. 9. The inner cylinder 2 fixing the operating part 5 and the first and second protrusions 33, 34 of the damper 3 held in the inner cylinder 2 are rotated by an angle of 25° in the counter-clockwise direction relative to the outer cylinder 1. The semicircular part 35 of the damper 3 is displaced from a position A to a position B in FIG. 6. The first and second protrusions 33, 34 protruding from the semicircular part 35 are guided along the first and second guide grooves 13, 14 of the outer cylinder 1 and moved to the upstream side in the counter-clockwise direction. As shown in FIG. 9, the inner peripheral edge 31*b* on the upstream side of the damper main body 31 is opened radially outward and the outer peripheral edge 31*a* n the downstream side thereof is moved radially inward. The outer peripheral edge 31*a* is moved radially inward than the inner peripheral edge 31*b*. The central portion 31*f* that is a lower end portion of the outer peripheral edge 31*a* disposed on the downstream side of the damper 3 is positioned radially inward than the apex 31*d* that is an upper end portion of the inner peripheral edge 31 disposed on the upstream side of the damper 3. At this time, as shown in the upper right figure of FIG. 12, the opening area of the opening region 71 of the fluid passage 7 becomes smaller than the opening area thereof in the full open position. The conditioned air 70 is concentrated in the vicinity of the center axis of the fluid passage 7 while being directed to the downstream side and therefore the concentrated wind is discharged from the outlet 80.

As shown in FIG. 10, the operating part 5 is rotated to a third position III that is displaced from the basic position I by an angle of about 10° to 30° in the clockwise direction on the paper sheet of FIG. 10. By the rotation of the operating part 5, the inner cylinder 2 and the first and second protrusions 33, 34 are rotated by an angle of about 10° to 30° in the clockwise direction relative to the outer cylinder 1. The semicircular part 35 of the damper 3 is displaced from the position A to a position C in FIG. 6. The first and second protrusions 33, 34 are guided along the first and second guide grooves 13, 14 of the outer cylinder 1 and moved to the downstream side in the clockwise direction. As shown in FIG. 10, the inner peripheral edge 31*b* on the upstream side of the damper main body 31 is moved radially inward and the outer peripheral edge 31*a* on the downstream side thereof is spread radially outward. The outer peripheral edge 31*a* is moved radially outward than the inner peripheral edge 31*b*. The central portion 31*f* that is a lower end portion of the outer peripheral edge 31*a* disposed on the downstream side of the damper 3 is positioned radially outward than the apex 31*d* that is an upper end portion of the inner peripheral edge 31 disposed on the upstream side of the damper 3. At this time, as shown in the lower left figure of FIG. 12, the opening area of the opening region 71 of the fluid passage 7 becomes smaller than the opening area thereof in the full open position. The conditioned air 70 is diffused radially outward of the fluid passage 7 while being directed to the downstream side and therefore the diffused wind is discharged from the outlet 80.

As shown in FIG. 11, the operating part 5 is rotated to a fourth position IV that is displaced from the basic position I by an angle of about 40° in the clockwise direction on the paper sheet of FIG. 11. By the rotation of the operating part 5, the inner cylinder 2 and the first and second protrusions 33, 34 are rotated by an angle of about 40° in the clockwise direction relative to the outer cylinder 1. The semicircular part 35 of the damper 3 is displaced from the position A to a position D in FIG. 6. The first and second protrusions 33, 34 are guided along the first and second guide grooves 13, 14 of the outer cylinder 1 and moved to the downstream side in the clockwise direction. As shown in FIG. 11, the inner peripheral edge 31b on the upstream side of the damper main body 31 is moved radially inward and the inner peripheral edges 31b of three dampers 3 are in contact with each other. The apexes 31d of the inner peripheral edges 31b of three dampers 3 are gathered on the center axis of the fluid passage 7 and the straight portions 31c of the adjacent dampers 3 are in contact with each other. Three dampers 3 are arranged radially around the apexes 31d to close the fluid passage 7. The outer peripheral edge 31a on the downstream side of the damper main body 31 is spread radially outward and comes into contact with the inner peripheral surface of the inner cylinder 2. At this time, as shown in the lower right figure of FIG. 12, the area of the opening region of the fluid passage 7 becomes zero. Blowing of the conditioned air 70 is stopped.

In the present embodiment, the inner cylinder 2 is moved relative to the outer cylinder 1 and the tilt angle of the damper 3 is changed in conjunction with the movement of the inner cylinder 2 whereby the fluid passage 7 is opened and closed. Therefore, it is not necessary to place the operating part 5 in the center of the fluid passage 7. When the damper 3 is positioned at the full open position, the fluid in the center of the fluid passage 7 is easily blown out and therefore it is possible to reduce the pressure loss of the conditioned air 70 flowing through the fluid passage 7.

When the damper 3 is positioned at the full open position, the inner peripheral edge 31b of each damper main body 31 is spaced apart from the inner peripheral edge 31b of other damper main bodies 31. Further, the outer peripheral edge 31a of each damper main body 31 is spaced apart from the inner peripheral surface of the inner cylinder 2. In this way, the area of the opening region is maximized when the fluid passage 7 is projected from the axial direction. Therefore, it is possible to increase the flow amount of the conditioned air 70.

When the damper 3 is positioned at the closed position, the inner peripheral edges 31b of each damper 3 of the damper group 30 are close to each other to close the fluid passage 7. Further, the outer peripheral edges 31a of each damper 3 are close to the inner peripheral surface of the inner cylinder 2 to close the space between each damper 3 and the inner peripheral surface of the inner cylinder 2. In this way, the whole of the fluid passage 7 is closed and therefore it is possible to stop the flow of the conditioned air.

When the damper 3 is positioned at the closed position, the inner peripheral edge 31b of the damper main body 31 is positioned on the upstream side. Therefore, the damper main body 31 is less likely to be visible from the outlet 80 on the downstream side of the fluid passage 7. Appearance of the damper opening and closing device 10 is improved.

When the damper 3 is positioned at the full open position, the operating part 5 is positioned in the opening region 71 of the fluid passage 7 and fluid is blown out to the downstream side through the operating part 5. Therefore, it is possible to rectify the wind direction by the operating part 5. Further, the operating part 5 is arranged while avoiding the center of the fluid passage 7 on which the wind passing is likely to be concentrated. Accordingly, it is possible to reduce the pressure loss.

Second Embodiment

Figure 13:
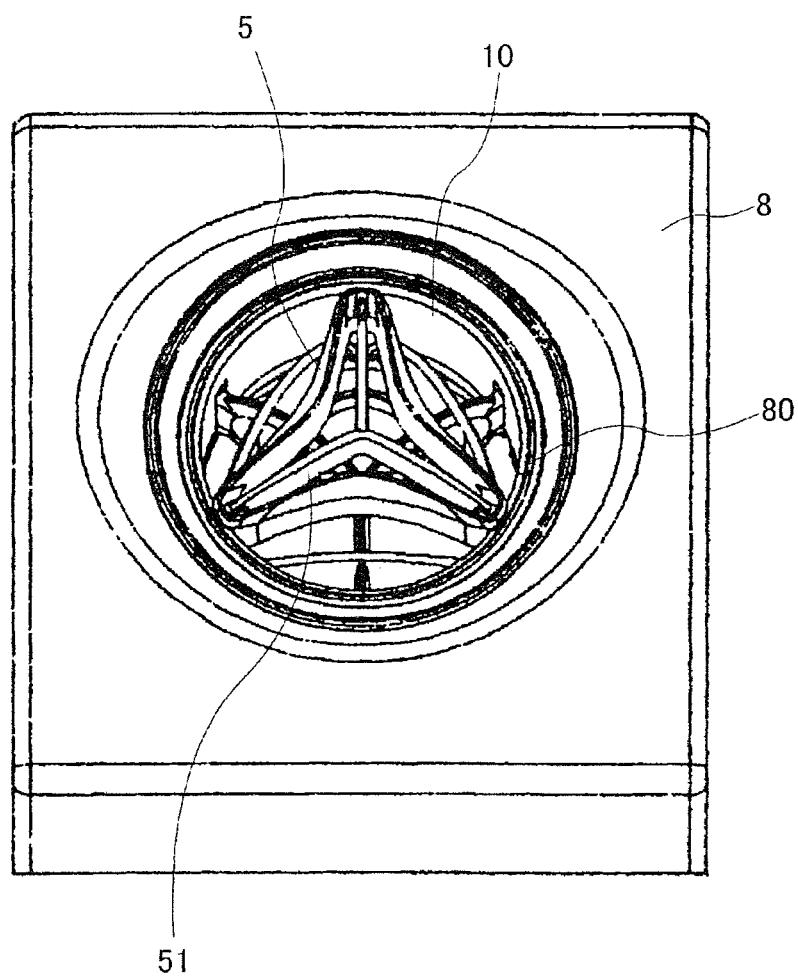
FIG. 13 is a plan view of a damper opening and closing device according to a second embodiment.
Figure 14:
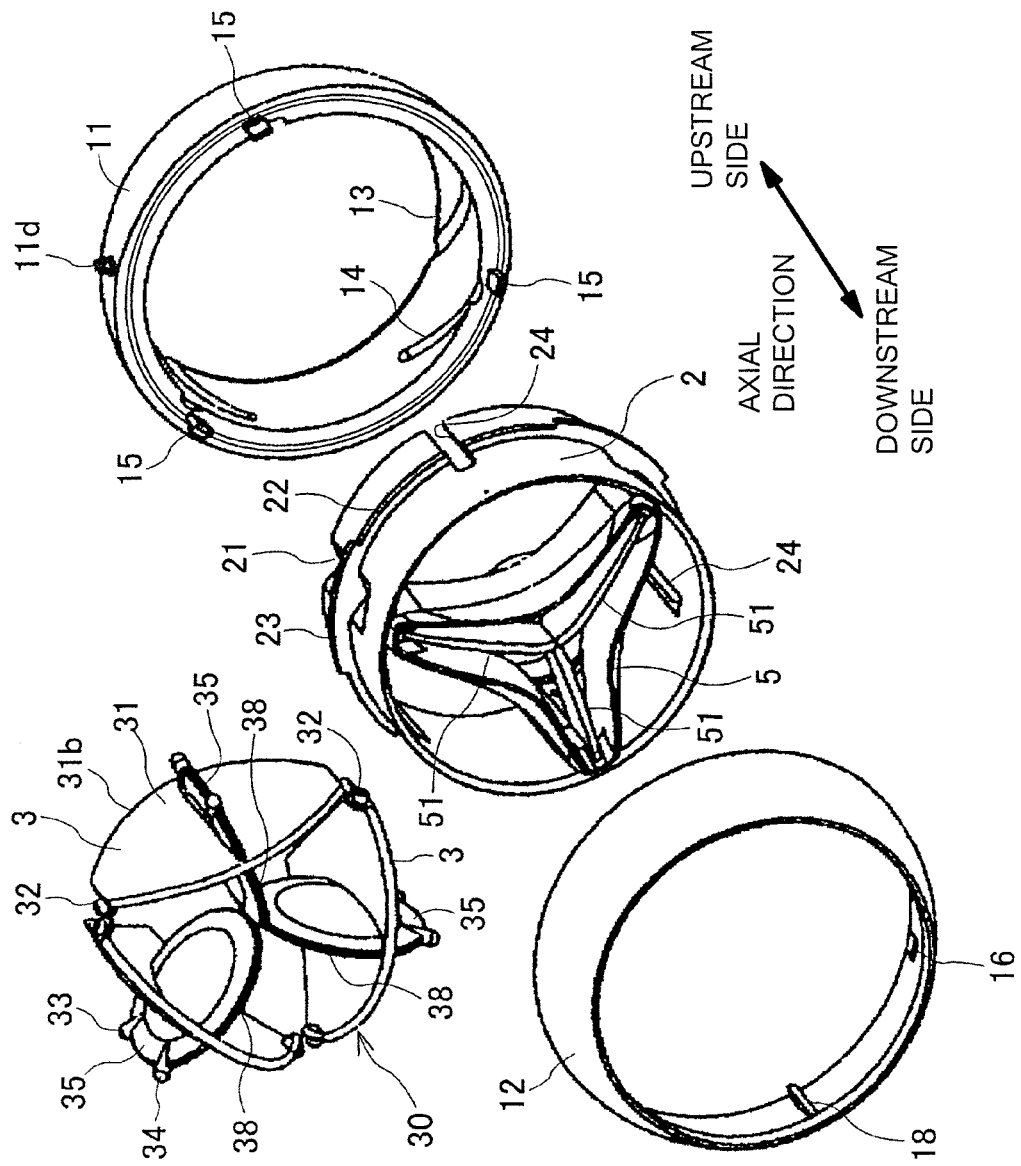
FIG. 14 is an exploded perspective view of the damper opening and closing device according to the second embodiment.

As shown in FIG. 13 and FIG. 14, three rectification fins 51 are radially arranged in the center of the operating part 5. Further, circular arc-shaped fin portions 38 are protruded toward the center axis of the fluid passage 7 from the inner surfaces of the damper main bodies 31 of each damper 3. The rectification fins 51 of the operating part 5 and the fin portions 38 of the dampers 3 are alternately arranged at equal intervals in the circumferential direction, as seen from the outlet 80 on the downstream side. The rectification fin 51 and the fin portion 38 have a thin-plate shape and are arranged along the axial direction. The conditioned air 70 flowing through the fluid passage 7 is rectified by the rectification fins 51 and the fin portions 38 and then blown out through the outlet 80. Accordingly, the rectification effect of the conditioned air is high.

Third Embodiment

Figure 15:
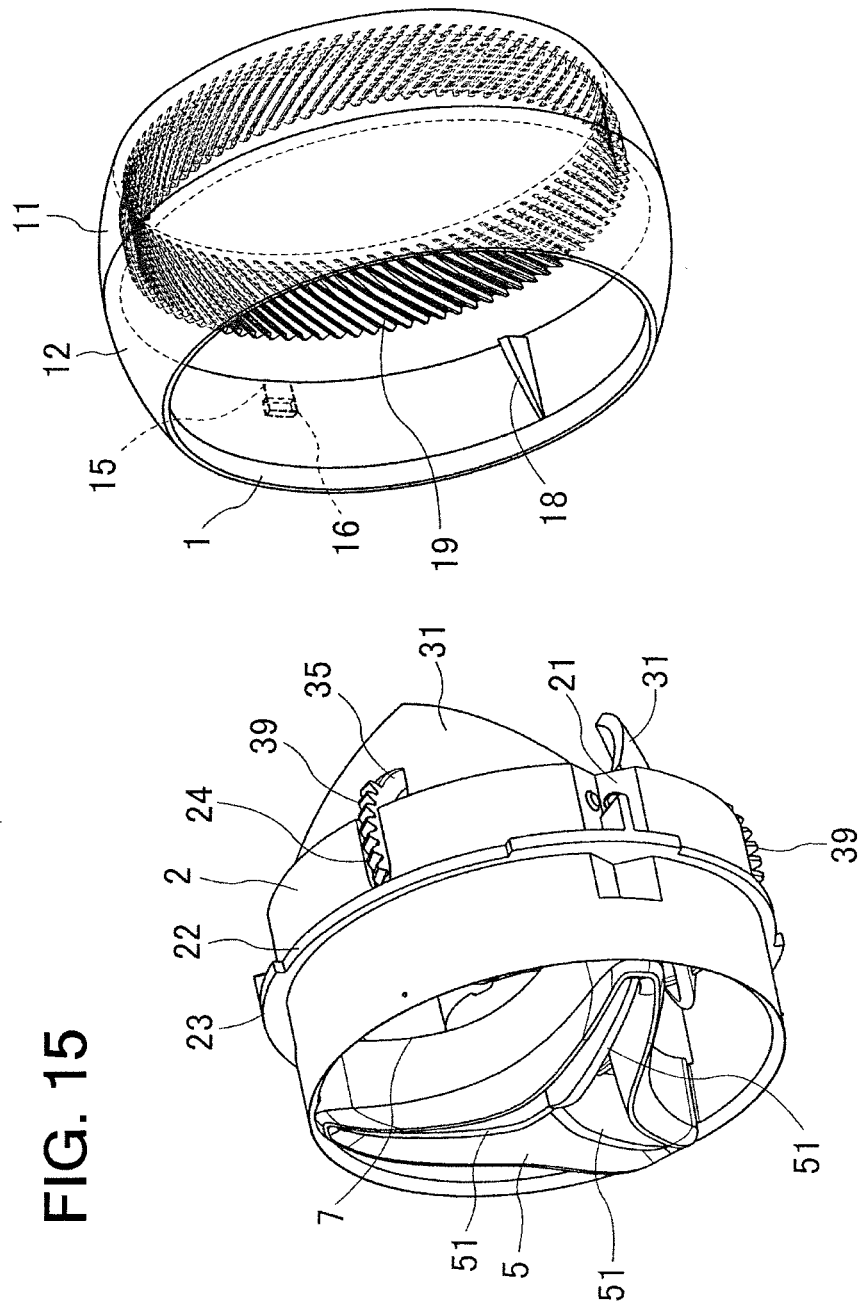
FIG. 15 is a perspective view of an inner cylinder that supports a damper and an outer cylinder in a third embodiment.
Figure 16:
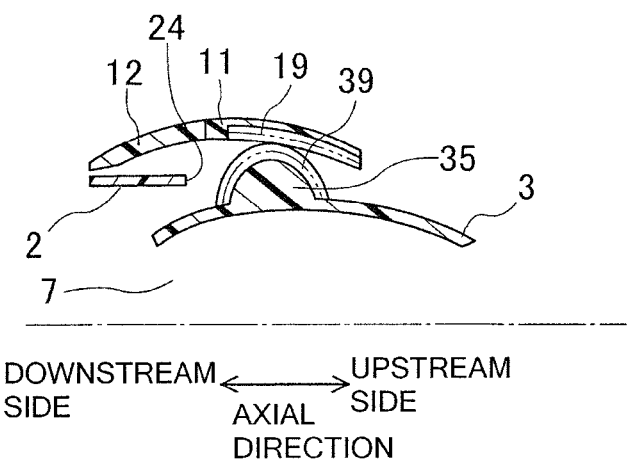
FIG. 16 is a sectional view of the damper opening and closing device according to the third embodiment.

In the third embodiment, the semicircular part 35 is protruded from the outer surface of the damper main body 31, as shown in FIG. 15 and FIG. 16. A pinion 39 consisting of helical gears is formed on an outer peripheral edge of the semicircular part 35. The semicircular part 35 is fitted into the slit 24 formed in the inner cylinder 2. A rack 19 consisting of internal gears is formed on an inner peripheral surface of the outer cylinder 1 and provided continuously over the entire circumferential direction thereof. The pinion 39 of the damper 3 is meshed with the rack 19 of the outer cylinder 1. When the inner cylinder 2 is rotated by the operation of the operating part 5, the pinion 39 of the damper 3 is moved axially along the tooth grooves of the rack 19. The damper 3 is swung around the support part 32 by the axial movement of the pinion 39 and opens and closes the fluid passage 7. The pinion 39 and the rack 19 configure an angle control means for controlling the tilt angle of the damper 3. Movements of the operating part 5, the inner cylinder 2, the outer cylinder 1 and the damper 3 are the same as in the first embodiment.

In the present embodiment, the tilt angle of the damper 3 is adjusted by the meshing of the helical gears and the internal gears of the outer cylinder 1. Accordingly, it is possible to accurately change the tilt angle of the damper 3 according to the relative movement amount of the outer cylinder 1.

In the first to third embodiments, the damper main body 31 of the damper 3 has a shape that is entirely smoothly curved. This is intended to increase the rigidity of the damper 3. The shape of the damper main body 31 is not limited to this shape. For example, the damper main body 31 may have a wholly flat-plate shape.

Further, although the damper group 30 consists of three dampers 3 in the first to third embodiments, any number of dampers may be used, as long as the number of dampers is two or more. Further, although the inner peripheral edge 31b of the damper main body 31 is disposed on the upstream side and the outer peripheral edge 31a thereof is disposed on the downstream side in the first to third embodiments, the inner peripheral edge 31b may be disposed on the downstream side and the outer peripheral edge 31a may be disposed on the upstream side Although the inner cylinder 2 is movable in the circumferential direction relative to the outer cylinder 1 in the first to third embodiments, the inner cylinder 2 may be moved in the axial direction relative to the outer cylinder 1 and an angle control means may adjust the opening and closing amount of the damper 3 in conjunction with the axial movement of the inner cylinder 2.

Although the operating part 5 is integrally fixed to the inner cylinder 2 in the first to third embodiments, the operating part 5 may be omitted. By directly operating the inner cylinder 2, the inner cylinder 2 may be moved relative to the outer cylinder 1.

In the first and second embodiments, in order to fit the first and second protrusions 33, 34 protruded from the semicircular part 35 into the first and second guide grooves 13, 14 of the outer cylinder 1, the inner cylinder 2 is formed with the slit 24 through which the semicircular part 35 is inserted. However, in a case where the inner cylinder 2 is not disposed in the position of the first and second protrusions 33, 34 of the damper 3, it is possible to fit the first and second protrusions 33, 34 into the first and second guide grooves 13, 14 of the outer cylinder 1 even without forming the slit in the inner cylinder 2.

Also in the third embodiment, the slit may not be formed in the inner cylinder 2, as long as the pinion 39 of the semicircular part of the damper 3 can be meshed with the rack 19 of the outer cylinder 1.

Although the damper opening and closing device 10 is used as an air-conditioning register for adjusting the flow amount of the conditioned air in the first to third embodiments, the damper opening and closing device may be used to adjust the flow amount of other fluid.

Fourth Embodiment

Figure 17:
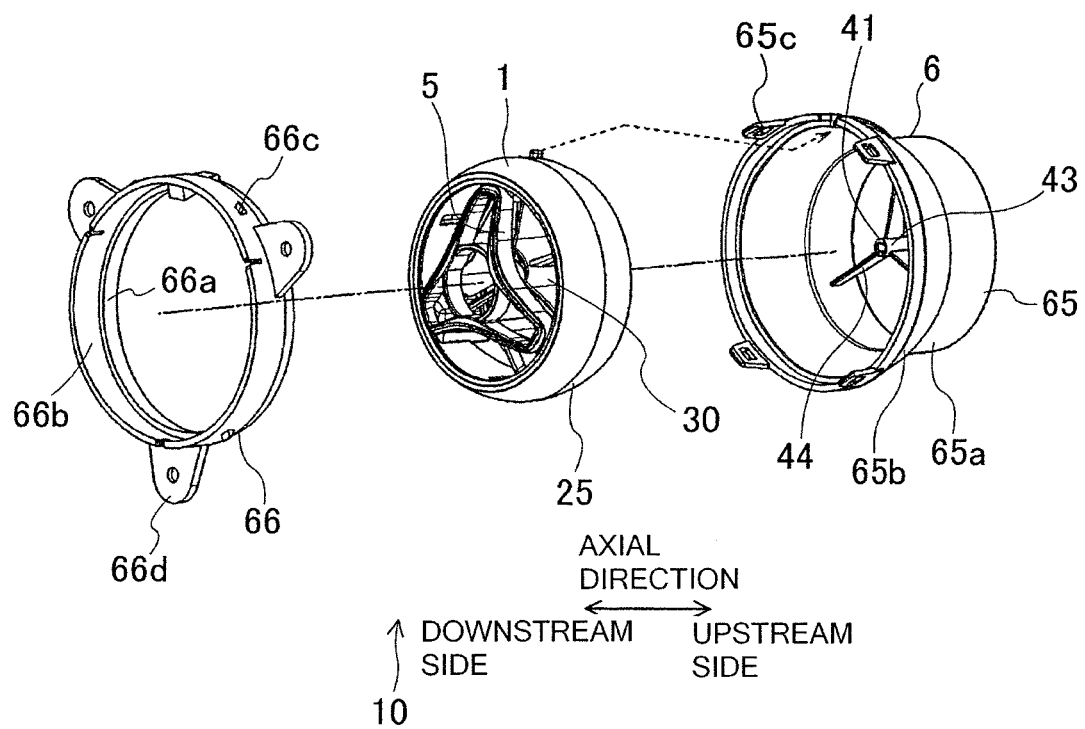
FIG. 17 is a perspective view of a first retainer member, a main body and a second retainer member of a damper opening and closing device according to a fourth embodiment.
Figure 18:
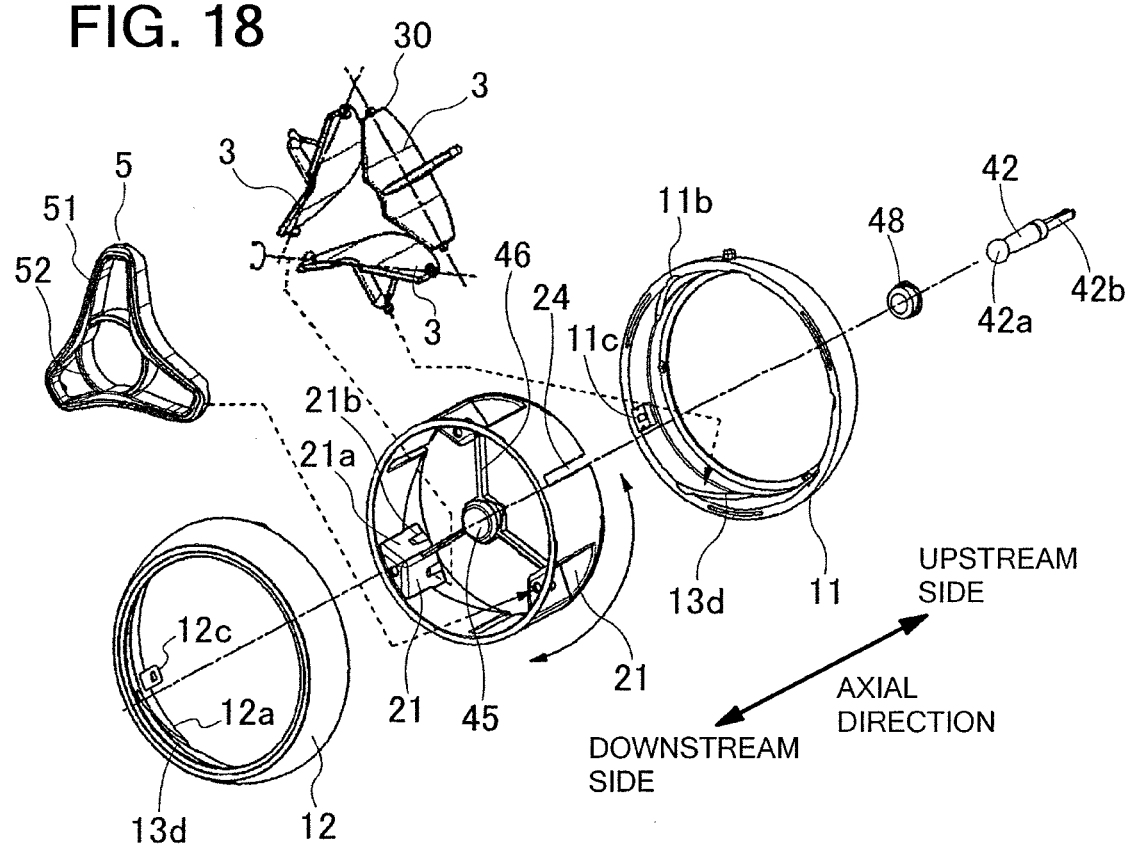
FIG. 18 is an exploded perspective view of the main body of the damper opening and closing device according to the fourth embodiment.
Figure 19:
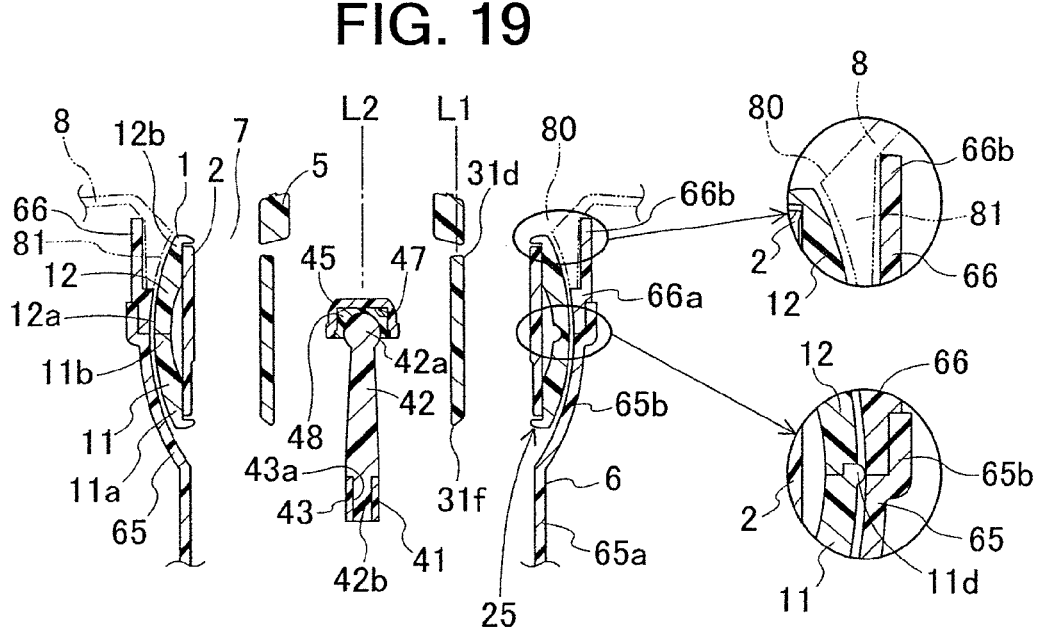
FIG. 19 is a sectional view of the damper opening and closing device according to the fourth embodiment.

As shown in FIG. 17 and FIG. 18, the fourth embodiment is a damper opening and closing device 10 that is mounted to a conditioned air outlet of an instrument panel of a vehicle. The damper opening and closing device 10 includes a cylindrical retainer 6 and a connection support part 41, as shown in FIG. 17 to FIG. 19. The retainer 6 integrally accommodates a main body 25 in a rotatable and tiltable manner. The main body 25 includes an outer cylinder 1, an inner cylinder 2 and a damper group 30. The connection support part 41 is fixed to the retainer 6 and positioned in the axial center of the retainer 6 to support the main body 25 in a rotatable and tiltable manner.

As shown in FIG. 17, the retainer 6 includes a first retainer member 65 disposed on the upstream side and a second retainer member 66 disposed on the downstream side of the first retainer member 65. A downstream side peripheral edge of the first retainer member 65 is outwardly fitted into an upstream side peripheral edge of the second retainer member 66. Protrusions 66c protruded from an outer peripheral surface of the second retainer member 66 are engaged with engaging portions 65c protruded from the downstream side peripheral edge of the first retainer member 65. In this way, the first and second integral members 65, 66 are integrated to form the retainer 6.

An upstream portion 65a of the first retainer member 65 has a cylindrical shape and a downstream portion 65b thereof has a diameter greater than that of the upstream portion 65a. As shown in FIG. 19, a downstream portion 66b of the second retainer member 66 is fitted into a peripheral edge 81 surrounding the outlet 80 of the instrument panel 8. As shown in FIG. 17, a flange part 66 protruded from an outer peripheral surface of the second retainer member 66 is engaged with an engaging part (not shown) of the instrument panel (not shown) 8. As shown in FIG. 19, an inner peripheral surface of the downstream portion 65b of the first retainer member 65, an inner peripheral surface of an upstream portion 66a of the second retainer member 66 and the peripheral edge 81 of the outlet 80 of the instrument panel 8 form a continuous spherical surface.

As shown in FIG. 17 and FIG. 19, the connection support part 41 is protruded from the upstream portion 65a of the first retainer member 65 and positioned in the axial center. The connection support part 41 includes a pin 42 having a ball portion 42a and a pin support part 43 having a holding hole 43a into which the pin 42 is fitted. The ball portion 42a of the pin 42 has a spherical surface and is provided in a leading end of the pin 42.

Figure 20:
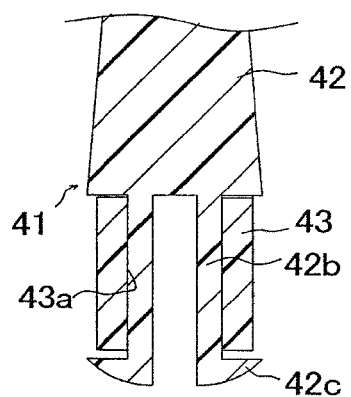
FIG. 20 is a sectional view of a connection support part.

As shown in FIG. 20, the pin 42 has, at a lower portion, an insertion portion 42b that is branched into two. A leading end of the insertion portion 42b has a hook shape that is protruded radially outward. When the insertion portion 42b is inserted into the holding hole 43a, a hook-shaped portion 42c of the leading end of the pin 42 is engaged with a peripheral edge of a leading end of the holding hole 43a and therefore the pin 42 is fixed to the pin support part 43. As shown in FIG. 17, the pin support part 43 is connected integrally with a first rib 44 that extends radially in three directions. The first rib 44 is integrally fixed to the upstream portion 65a of the first retainer member 65 and therefore the pin support part 43 is held on the center axis of the retainer 6.

As shown in FIG. 17 and FIG. 18, the main body 25 of the damper opening and closing device 10 is integrally accommodated in the inside of the retainer 6. The main body 25 is configured by the outer cylinder 1, the inner cylinder 2, the damper group 30 and the operating part 5.

As shown in FIG. 18, the outer cylinder 1 includes a first member 11 and a second member 12 disposed in a downstream side closer to the outlet 80 than the first member 11. Three engaging protrusions 11c are protruded from three sites of a downstream side peripheral edge 11b of the first member 11 and three engaging recesses 12c are formed in three sites of an upstream side peripheral edge 12a of the second member 12. The engaging protrusions 11c are engaged with the engaging recesses 12c. In this way, the first member 11 and the second member 12 are integrally fixed to each other. Each of the first member 11 and the second member 12 has a cylindrical shape and internal spaces thereof have the same center axis.

As shown in FIG. 19, the outer peripheral surface of the first member 11 and the outer peripheral surface of the second member 12 are opposed to the inner peripheral surface of the retainer 6 with a slight gap therebetween. The outer peripheral surface of the first member 11 and the outer peripheral surface of the second member 12 form a spherical shape corresponding to a spherical shape of the inner peripheral surface of the retainer 6. A protrusion 11d is formed in an outer peripheral surface of the first member 11. The protrusion 11d is an abutting seat for managing a gap between the inner peripheral surface of the retainer 6 and the first member 11.

Figure 21:
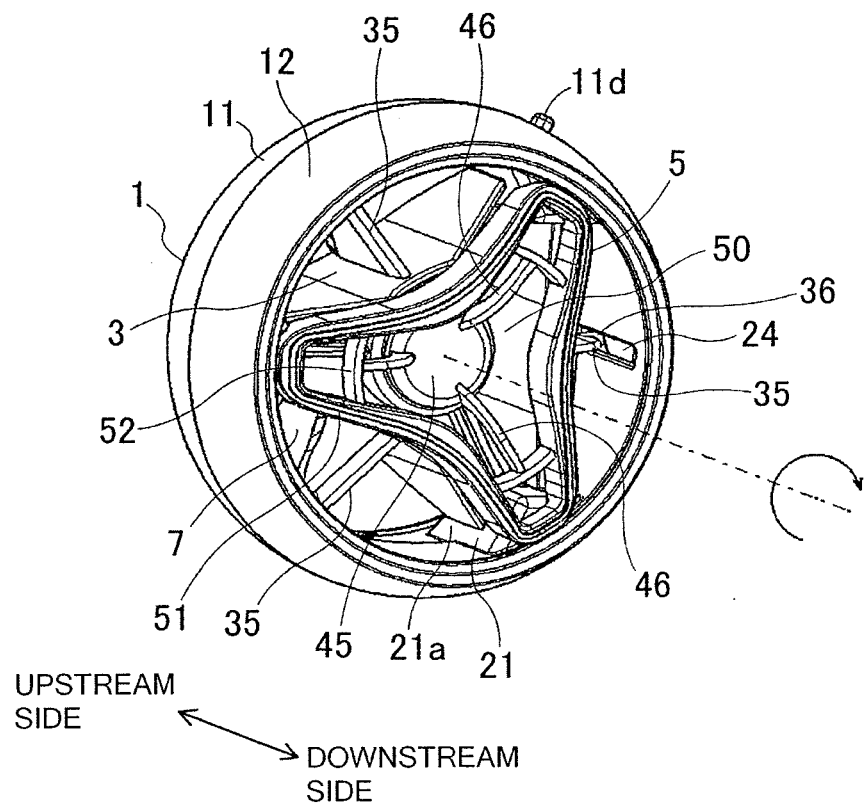
FIG. 21 is a perspective view of the main body of the damper opening and closing device according to the fourth embodiment.
Figure 22:
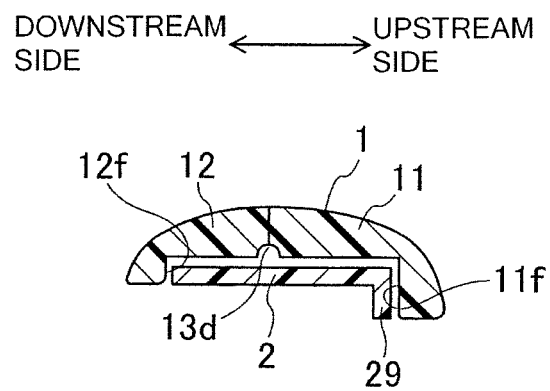
FIG. 22 is a sectional view of an inner cylinder and an outer cylinder.

As shown in FIG. 18, spiral-shaped guide grooves 13d are recessed in an inner peripheral surface of the outer cylinder 1. The guide grooves 13d are disposed in three sites in the circumferential direction of the inner peripheral surface of the outer cylinder 1. As shown in FIG. 21, an upstream portion and a downstream portion of the guide groove 13d are respectively disposed in the first member 11 and the second member 12 of the outer cylinder 1. The inner cylinder 2 has a cylindrical shape that has the same axis as the outer cylinder 1. As shown in FIG. 22, the inner cylinder 2 has, at an upstream side end, a seat portion 29 protruding radially inward. The seat portion 29 and a downstream side end of the inner cylinder 2 are pivotably engaged with stepped portions 11f, 12f formed in the inner peripheral surfaces of the first member 11 and the second member 12 of the outer cylinder 1, respectively, and therefore the inner cylinder 2 is pivotably held relative to the outer cylinder 1.

As shown in FIG. 18 and FIG. 21, convex portions 21 are formed in the inner cylinder 2 and protruded radially inward in a triangular shape. Three convex portions 21 are formed in three sites at intervals of 120° in the circumferential direction of the inner cylinder 2. Each convex portion 21 includes a pair of inclined surfaces 21a that are connected to each other across an apex. Each inclined surface 21a is respectively formed with a hole as a bearing portion 21b.

A slit 24 is formed on the upstream side portion of the inner cylinder 2. The slit 24 is extended in an axial direction of the inner cylinder 2. The slit 24 has one end opened toward an upstream side peripheral edge and the other end closed and positioned at a substantially downstream side portion in an axial direction of the inner cylinder 2. Three slits 24 are formed in three sites at intervals of 120° in the circumferential direction of the inner cylinder 2. These slits 24 are formed between two convex portions 21 in the circumferential direction of the inner cylinder 2.

Covering ribs 46 are integrally connected to the apexes of three convex portions 21 of the inner cylinder 2 that are protruded in a triangular shape. The covering ribs 46 are extended radially inward and toward the axial center of the inner cylinder 2. A main body support part 45 is disposed in the intersecting axial center of three covering ribs 46. As shown in FIG. 19, the main body support part 45 is configured in such a way that an upstream side thereof is recessed and a sliding portion 47 is provided in the recessed portion.

As shown in FIG. 19, the sliding portion 47 supports, via the shim 48, the ball portion 42a of the pin 42 of the connection support part 41 fixed to the retainer 6. Since the ball portion 42a is supported by the sliding portion 47, the inner cylinder 2 is integrally pivotable in all directions relative to the retainer 6. As the inner cylinder 2 is pivoted relative to the retainer 6, the outer cylinder 1 holding the inner cylinder 2 and the damper group 30 supported on the inner cylinder 2 can be integrally pivoted in all directions.

As shown in FIG. 21 and FIG. 18, the operating part 5 includes a substantially triangular frame-shaped thin plate 51 extending in an axial direction of the fluid passage 7 and a circular arc portion 52 connected to the thin plate 51. The center of the circular arc portion 52 is common to the center of the triangular frame-shaped thin plate 51. Each apex of the triangular frame-shaped thin plate 51 is integrally fixed to a downstream side inner peripheral surface of the inner cylinder 2. Spaces 50 through which fluid can flow are formed between the inner cylinder 2 and the operating part 5, between the thin plate 51 and the circular arc portions 52 and in the interior of the circular arc portions 52. The circular main body support part 45 fixed to the inner cylinder 2 and the covering rib 46 are exposed to the space 50 that is formed radially inward of the circular arc portions 52.

As shown in FIG. 21, the damper group 30 is disposed in the fluid passage 7 which is formed inside the inner cylinder 2. The damper group 30 is composed of three dampers 3. Each damper 3 is supported swingably relative to the inner cylinder 2. By swinging of the damper 3 relative to the inner cylinder 2, a tilt angle of the damper 3 to an axial direction of the fluid passage 7 is adjusted.

Figure 23:
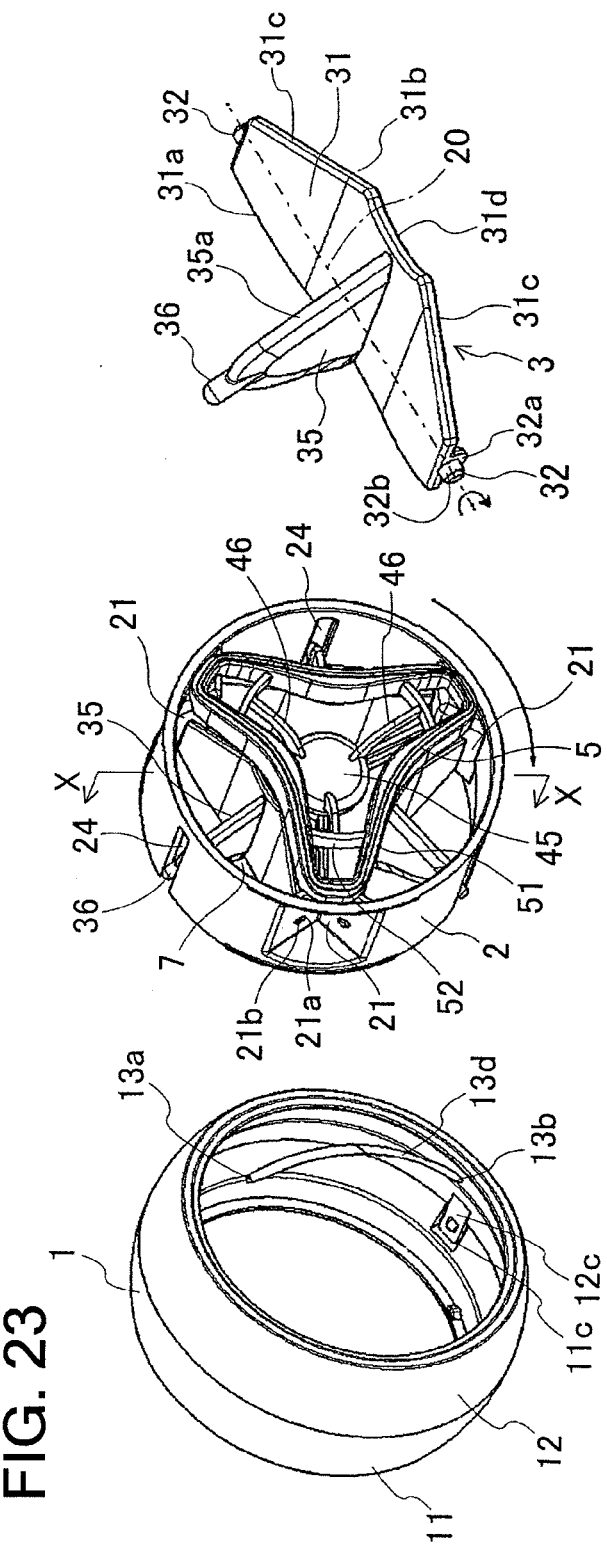
FIG. 23 shows the fourth embodiment, a left figure of FIG. 23 is a perspective view of the outer cylinder, a middle figure of FIG. 23 is a perspective view of the inner cylinder to which an operating part and a damper group are mounted and a right figure of FIG. 23 is a perspective view of the damper.

As shown in FIG. 23, three dampers 3 have the same structure as each other. Each damper 3 includes a damper main body 31 having a substantially fan-like shape, a pair of support parts 32 provided at both ends in the circumferential direction of the damper main body 31 and a protrusion 36 provided in an outer surface of the damper main body 31. The support part 32 includes a folded-back portion 32a that is folded back inward from the damper main body 31 and a shaft portion 32b that is protruded to an outer surface of the folded-back portion 32a. The shaft portion 32b is pivotably fitted into the bearing portion 21b that is formed in the inclined surface 21a of the convex portion 21 of the inner cylinder 2. Since the shaft portion 32b is pivotably fitted into the bearing portion 21b, the damper 3 are held swingably relative to the inner cylinder 2.

A plurality of bearing portions 21b is arranged at positions that are located at equal intervals in the circumferential direction of the inner cylinder 2. Each damper 3 is swung relative to the inner cylinder 2 while using, as a pivot axis, a chord 20 connecting linearly respective bearing portions 21 adjacent to each other (see FIG. 3). Since the damper 3 is swung relative to the inner cylinder 2, the tilt angle of the damper 3 to the axial direction of the fluid passage 7 is changed and therefore the amount of conditioned air flowing through the fluid passage 7 is regulated.

As shown in FIG. 18 and FIGS. 26A to 26D, the damper main body 31 is disposed swingably at a predetermined angle relative to an axial direction. An inner peripheral edge 31b of the damper main body 31 is oriented radially inward of the fluid passage 7 and an outer peripheral edge 31a of the damper main body 31 is oriented radially outward of the fluid passage 7. Further, the entire shape of the damper main body 31 is flat.

The damper main body 31 is surrounded by the outer peripheral edge 31a and the inner peripheral edge 31b. The outer peripheral edge 31a is located between a pair of support parts 32 and formed on the outside of the support parts 32. The inner peripheral edge 31b is located between a pair of support parts 32 and formed on the inside of the support parts 32. The outer peripheral edge 31a of the damper main body 31 has a smooth circular-arc shape. The outer peripheral edge 31a of the damper main body 31 is located in the downstream side of the damper 3 and faces an inner peripheral surface of the inner cylinder 2. As shown in a lower figure of FIG. 24, since the outer peripheral edge 31a of the damper main body 31 comes into slant contact with the inner peripheral surface of the inner cylinder 2 when the damper 3 is in a closed position, the outer peripheral edge 31a draws a circular arc smoother than the inner peripheral surface of the inner cylinder 2. As the tilt angle of the damper main body 31 to the axial direction of the fluid passage 7 is changed, the space between the outer peripheral edge 31a of the damper main body 31 and the inner cylinder 2 is opened and closed.

As shown in FIG. 19, the tilt angle refers to an angle that is formed by a line L1 and a center axis L2 of the fluid passage 7. The line L1 connects a central portion 31f of the outer peripheral edge 31a of the damper main body 31 with the apex 31d that is a central portion of the inner peripheral edge 31b of the damper main body 31.

As shown in FIG. 23, the inner peripheral edge 31b of the damper main body 31 is located in the downstream side of the damper 3 and opposed to the inner peripheral edge 31b of the damper main body 31 of other dampers 3. The inner peripheral edge 31b of the damper main body 31 includes a pair of straight portions 31c extending linearly from each support part 32 at both ends thereof and an apex 31d formed between the pair of straight portions 31c. The semicircular part 35 having a substantially semicircular disc shape is protruded from an outer surface of the damper main body 31. Both ends of a circular arc-shaped edge 35a of the semicircular part 35 are disposed on the upstream side and downstream side in the axial direction of the fluid passage 7. The protrusion 36 is provided on the center of the edge 35a of the semicircular part 35 and protruded radially outward of the semicircular part 35.

The semicircular part 35 of the damper 3 is inserted through the slit 24 of the inner cylinder 2. The protrusion 36 protruded from the semicircular part 35 of the damper 3 is fitted into the guide groove 13d of the outer cylinder 1. The protrusions 36 can be moved along the guide groove 13d. When the outer cylinder 1 is rotated relative to the inner cylinder 1, the protrusion 36 of the damper 3 held in the inner cylinder 2 is moved along the guide groove 13d of the outer cylinder 1.

The guide groove 13d has a helical shape. When the inner cylinder 2 is pivoted in the circumferential direction by the operation of the operating part 5, the outer cylinder 1 is pivotally moved relative to the inner cylinder 2. When the protrusion 36 is moved in the guide groove 13d by the rotational movement in the circumferential direction of the outer cylinder 1, the axial position of the protrusion 36 is changed. Since the axial position of the protrusion 36 relative to the shaft portion 32b of the damper 3 is changed, the damper 3 are swung around the shaft portion 32b. As the protrusion 36 is moved to the upstream side, the inner peripheral edge 31b of the damper main body 31 is moved radially outward and the outer peripheral edge 31a of the damper main body 31 is moved radially inward. As the protrusion 36 is moved to the downstream side, the inner peripheral edge 31b of the damper main body 31 is moved radially inward and the outer peripheral edge 31a of the damper main body 31 is moved radially outward. In this way, the guide groove 13d axially moves the protrusion 36 in conjunction with the pivoting of the inner cylinder 2. The protrusion 36 and the guide groove 13d configure an angle control means that controls the tilt angle of the damper 3 in conjunction with the movement of the inner cylinder 2 relative to the outer cylinder 1.

As shown in FIG. 21 and FIG. 23, when the protrusion 36 is positioned in the upstream side end portion 13a of the guide groove 13d, each of three dampers 3 configuring the damper group 30 is configured in such a way that respective damper main bodies 31 are disposed parallel to the axial direction of the inner cylinder 2. At this time, the tilt angle of the damper 3 is 0°.

When the inner cylinder 2 is pivoted to the right direction on the paper sheet of FIG. 23 by the operation of the operating part 5, the protrusion 36 is moved from the upstream side end portion 13a of the guide groove 13d to the downstream side of the guide groove 13d. As a result, the tilt angle of the damper 3 is gradually increased while the inner cylinder 2 is pivoted relative to the outer cylinder 1 and the inner peripheral edge 31b of the damper 3 is moved radially inward. When the protrusion 36 is moved to the downstream side end portion 13b of the guide groove 13d, the protrusion is stopped at that position and further pivoting of the inner cylinder 2 is stopped.

Figure 24:
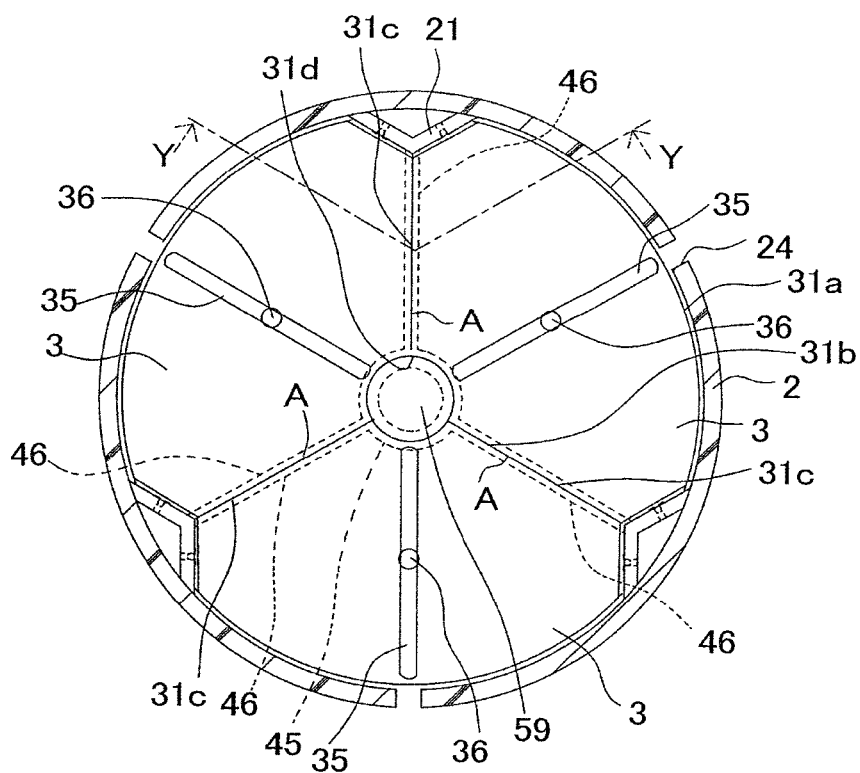
FIG. 24 is a sectional view taken along an arrow X-X in the middle figure of FIG. 23.
Figure 25:
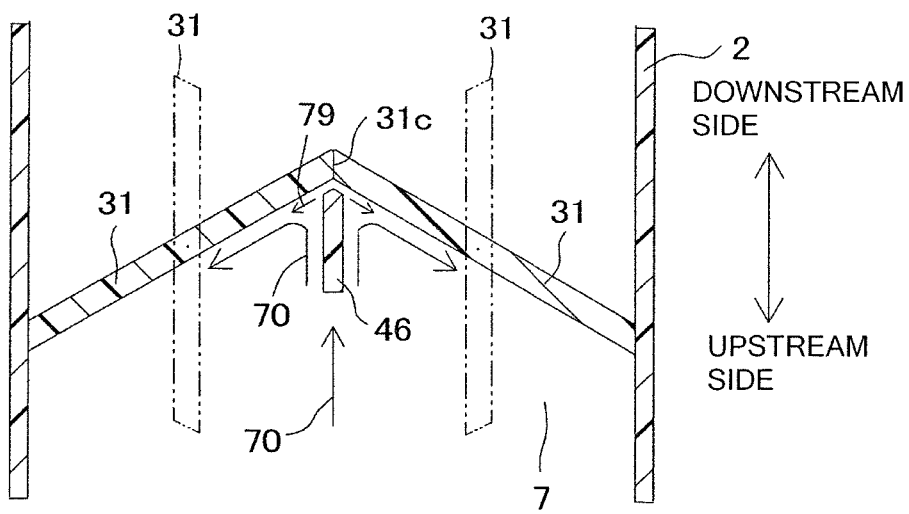
FIG. 25 is a sectional view taken along an arrow Y-Y in FIG. 24 when the damper is in the closed position.

At this time, the inner peripheral edges 31b of the dampers 3 are in contact with each other in the straight portion 31c to close the fluid passage 7, as shown in FIG. 24. The space between the outer peripheral edges 31a of the dampers 3 and the inner peripheral surface of the inner cylinder 2 is closed. Since the apex 31d of the damper main body 31 is recessed in a concave shape, a circular clearance 59 is formed when three damper main bodies 31 are closed. However, since this clearance 59 is covered with the main body support part 45, the flow of fluid in the fluid passage 7 is closed.

Here, as shown in FIG. 24, the straight portions 31c of the damper main bodies 31 of respective dampers 3 are in contact with each other and closed when the dampers 3 are closed. Boundary lines A formed between the inner peripheral edges 31b of three dampers 3 form a radial shape around the axial center of the inner cylinder 2. The covering ribs 46 are located in the positions where the straight portions 31c of the closed damper main bodies 31 are disposed. The covering ribs 46 form a radial shape along the boundary lines A between the dampers 3. The upstream side of the straight portions 31c of the closed damper main bodies 31 is covered with the covering ribs 46. The conditioned air 70 circulated from the upstream side of the fluid passage 7 flows along both sides of the covering rib 46 while avoiding the covering rib 46. The conditioned air 70 circulated up to a leading end of the covering rib 46 collides with the closed damper main body 31 and then flows radially outward along the damper main body 31. Air 79 present in the clearance between the straight portions 31c of the damper main bodies 31 and the covering ribs 46 is sucked to the flow of the conditioned air 70 flowing radially outward and then flows radially outward together with the conditioned air 70. In this way, air is not leaked through the clearance between the straight portions 31c of the damper main bodies 31 and therefore it is possible to securely prevent the air from flowing to the downstream side.

Now, aspects of the cross-sectional shape of the covering rib 46 are described with reference to FIGS. 26A to 26D. As shown in FIGS. 26A to 26D, the portion of the covering rib 46 facing the damper main body 31 may have a shape along the shape near the straight portion 31c of the damper main body 31. For example, the cross-sectional shape of the covering rib 46 shown in FIG. 26A exhibits an elongated rectangular shape extending parallel to the center axis of the inner cylinder 2. The portion of the covering rib 46 facing the damper main body 31 forms a slant surface 46a along the tilting direction of the damper main body 31.

Figure 26B:
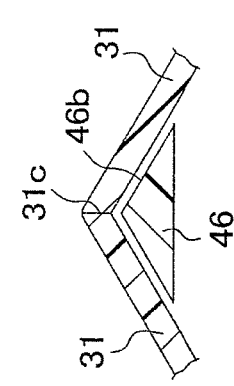
FIGS. 26A to 26D are sectional views of various second ribs.
Figure 26D:
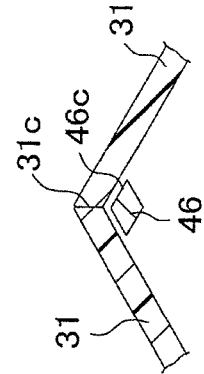

The cross-sectional shape of the covering rib 46 shown in FIG. 26B exhibits a triangular shape. The portion of the covering rib 46 facing the damper main body 31 forms a slant surface 46b along the tilting direction of the damper main body 31. The cross-sectional shape of the covering rib 46 shown in FIG. 26C exhibits an elongate rectangular shape extending parallel to the center axis of the inner cylinder 2. The straight portion 31c of the damper main body 31 is formed with a concave stepped portion 31g along the shape of the covering rib 46. The cross-sectional shape of the covering rib 46 shown in FIG. 26D exhibits a diamond shape having a portion 46c that extends along the tilting direction of the damper main body 31. Although various shapes of the covering rib 46 have been illustrated in FIG. 26, the shape of the covering rib 46 is not limited to these shapes.

Figure 26A:
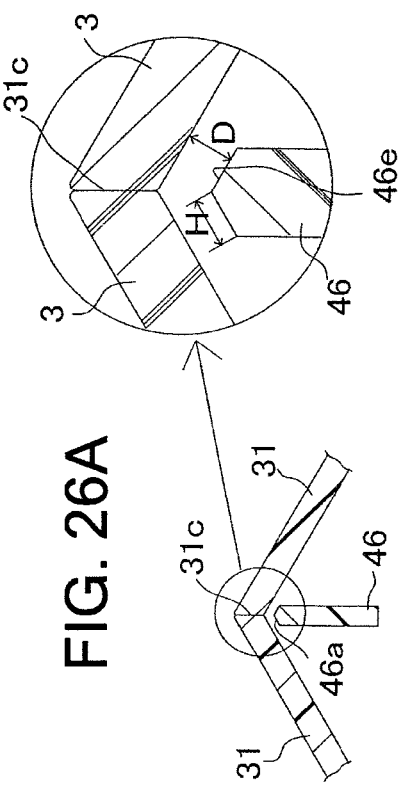
Figure 26C:
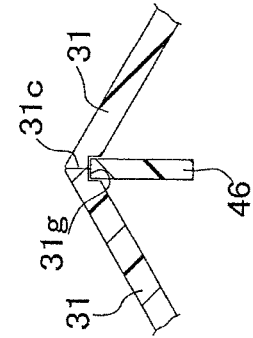
Figure 27:
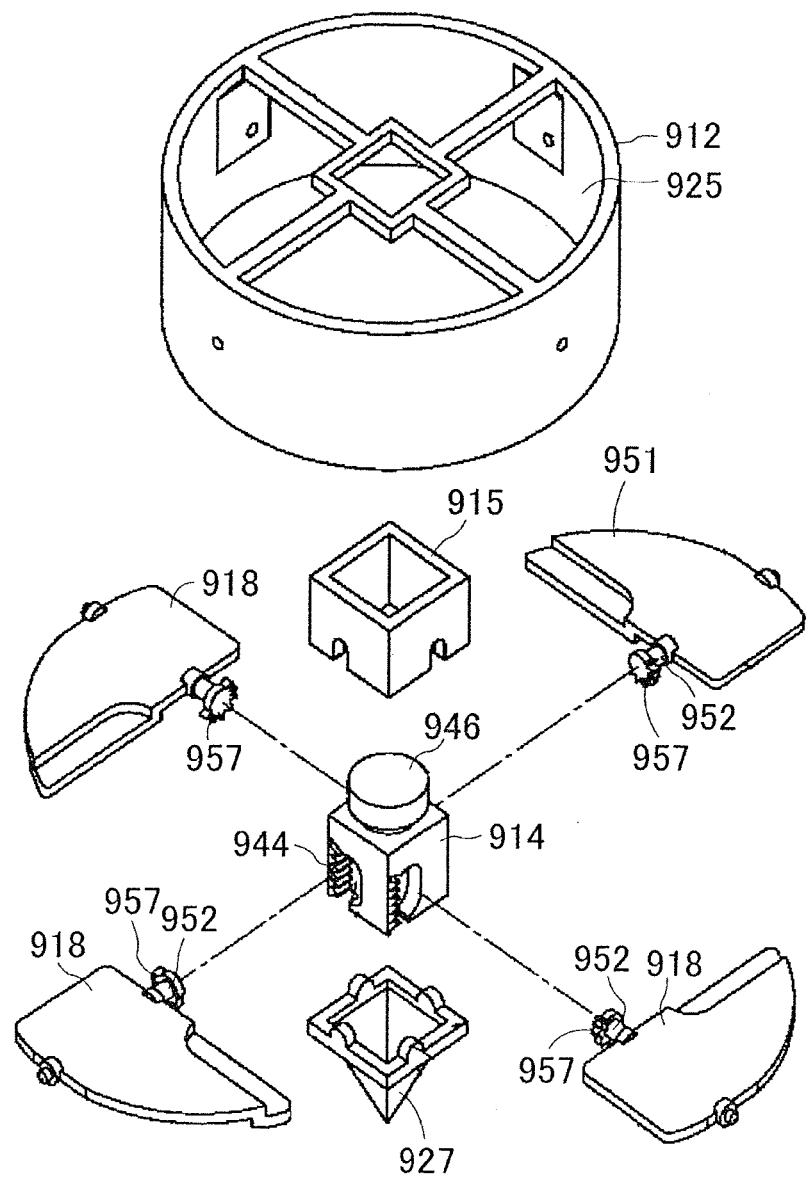
FIG. 27 is a sectional view of a conventional damper opening and closing device.

As shown in the circled portion of FIG. 26A, an opposing surface 46e of the covering rib 46 opposed to the damper 3 may be parallel or non-parallel to the damper 3 in the closed position. However, it is desirable that the opposing surface 46e is parallel to the damper 3. When the opposing surface 46e of the covering rib 46 is parallel to the damper 3, it is possible to avoid a phenomenon that the damper 3 interferes with the covering rib 46. Further, a gap between the opposing surface 46e of the covering rib 46 and the damper 3 in the closed position may be gradually increased or decreased toward the center of the opposing surface 46e. Alternatively, the gap between the opposing surface 46e and the damper 3 may be the same over the whole opposing surface 46e.

Preferably, an average gap D between the opposing surface 46e of the covering rib 46 and the damper 3 in the closed position is in a range of 0 mm or more but 2.0 mm or less. When the average gap D is too small, there is a possibility that the damper 3 interferes with the covering rib 46 during swinging of the damper. On the contrary, when the average gap D is too large, the conditioned air 70 flows through the gap between the opposing surface 46e of the covering rib 46 and the damper 3 and thus, there is a possibility that the conditioned air 70 leaks to the downstream side from clearances between the dampers 3.

A width H of the opposing surface 46e of the covering rib 46 is preferably in a range of 0.4 mm or more but 1 mm or less. When the width H is too small, the effect of covering the space between the dampers 3 is reduced and thus, here is a possibility that the conditioned air leaks from clearances between the dampers 3. On the contrary, when the width H is too large, there is a possibility that the damper 3 interferes with the covering rib 46 during swinging of the damper. When the dimension of the width H is large, there is a possibility that the pressure loss is increased.

According to the present embodiment, the covering rib 46 is disposed on the upstream side of the damper 3 in the fluid passage 7, as shown in FIG. 24. When the damper 3 is in the closed position, the covering rib 46 covers the inner peripheral edge 31b of the damper 3 and the inner peripheral edge 31b of other damper 3 adjacent thereto along the boundary lines A between the inner peripheral edges 31b of the dampers 3 that are adjacent to each other. Therefore, when the conditioned air 70 is circulated from the upstream side, the conditioned air 70 is blocked by the covering rib 46 and therefore it is possible to securely prevent the conditioned air from leaking to the downstream side from the boundary lines A between the inner peripheral edges 31b of the dampers 3 that are adjacent to each other. Further, since the covering rib 46 has an elongated rib shape, the covering rib does not hinder the flow of the conditioned air 70 passing through the fluid passage 7 and therefore it is possible to suppress the pressure loss.

The covering ribs 46 form a radial shape corresponding to the radial-shaped boundary line A that is formed when each damper 3 is in the closed position. Therefore, the covering ribs cover the spaces between the inner peripheral edges 31b of all of the dampers 3 which are disposed in the fluid passage 7. In this way, it is possible to securely prevent the conditioned air 70 from leaking through the clearance between the inner peripheral edges 31b of the dampers 3.

The covering ribs 46 are extended radially inward from the inner cylinder 2. Each damper 3 includes a pair of support parts 32 that is pivotally supported on each of the pair of bearing portions 21b of the inner cylinder 2. Accordingly, the damper is swingably fixed to the inner cylinder 2 in a stable manner.

As shown in FIG. 23, a plurality of bearing portions 21b is arranged at positions that are located at equal intervals in the circumferential direction of the inner cylinder 2 and each damper 3 is swung while using, as a pivot axis, the chord 20 connecting linearly respective bearing portions 21. Since the damper is swingably fixed to the inner cylinder 2 in a stable manner, it is possible to reduce the gap between the inner peripheral edges 31b of the dampers 3 in the closed position. Accordingly, it is possible to more securely prevent the leakage of the conditioned air 70 when the dampers are closed.

The inner peripheral edge 31b of the damper 3 is disposed at the downstream side of the pivot axis of the damper 3 in the fluid passage 7 when the damper 3 is in the closed position. When the inner peripheral edge 31b of the damper 3 in the closed position is disposed at the downstream side of the pivot axis thereof, the covering ribs 46 can be positioned in the sites other than the movement trajectory of the damper 3 to be opened and closed. Accordingly, the interference between the damper 3 and the covering rib 46 can be prevented and therefore it is possible to open and close the damper 3 smoothly.

Furthermore, the damper opening and closing device includes the cylindrical retainer 6 and the main body support part 45, as shown in FIG. 18 and FIG. 19. The retainer 6 integrally accommodates the main body 25 in a rotatable manner. The main body 25 includes the outer cylinder 1, the inner cylinder 2 and the damper group 30. The main body support part 45 is connected to the covering rib 46 that is extended radially inward from the inner cylinder 2. The main body support part 45 is positioned in the axial center of the inner cylinder 2 to pivotably support the main body relative to the retainer 6. Therefore, it is possible to vary collectively the tilt angle of all of the dampers 3 configuring the damper group 30 by adjusting the tilt angle of all of the main bodies 25 with respect to the retainer 6. Accordingly, it is possible to freely adjust the direction of the conditioned air 70 flowing out from the outlet 80. Further, the covering rib 46 also serves as a connection member for holding the main body support part 45 in the inner cylinder 2. Accordingly, it is possible to prevent the fluid from flowing out to the downstream side of the damper 3 during closing without increasing the number of parts of the damper opening and closing device 10.

In the fourth embodiment, the connection support part 41 is fixed to the retainer 6 and includes the pin 42 having the ball portion 42a. The main body support part 45 is fixed to the inner cylinder 2 and the sliding portion 47 formed in the main body support part 45 is supported to the pin 42 via the shim 48 made of elastic rubber or silicone so as to be pivotable in all directions together with the ball portion 42a of the pin 42. Therefore, as the main body 25, the inner cylinder 2 fixing the main body support part 45, the outer cylinder 1 supporting the inner cylinder 2, the damper group 30 held in the inner cylinder 2 and the operating part 5 can be integrally pivotable in all directions.

Since the sliding portion 47 is smoothly pivoted relative to the ball portion 42a of the pin 42, the main body 25 can be smoothly and stably pivoted.

Further, both the connection support part 41 and the main body support part 45 are disposed within the fluid passage 7. The connection support part 41 is fixed to the retainer 6 via the first rib 44 and the main body support part 45 is fixed to the inner cylinder 2 via the covering rib 46. The first rib 44 and the covering rib 46 are disposed in the same position in the radial direction of the fluid passage 7. Further, both the first rib 44 and the covering rib 46 have an elongated shape extending parallel to the axial direction of the fluid passage 7. In addition, although being disposed on the center axis of the fluid passage 7, the connection support part 41 and the main body support part 45 are relatively small in the fluid passage 7. Therefore, it is possible to suppress the pressure loss in the fluid passage 7.

Further, the inner peripheral edge 31b of the damper main body 31 is disposed on the downstream side of the fluid passage 7 and the outer peripheral edge 31a of the damper main body 31 is disposed on the upstream side of the fluid passage 7. The connection support part 41 is disposed on the upstream side of the damper 3. In this way, a hand is prevented from being pinched between the damper 3 during swinging and the inner cylinder 2 when a hand is inserted through the outlet 80 on the downstream side and therefore the hindrance for the opening and closing of the damper 3 can be prevented.

Although the connection support part 41 is the pin 42 erected in the pin support part 43 in the fourth embodiment, the pin 42 may be molded integrally with the pin support part 43. Further, although the connection support part 41 fixed to the retainer 6 includes the pin 42 having the ball portion 42a and the main body support part 45 fixed to the inner cylinder 2 includes the sliding portion 47 in the fourth embodiment, the connection support part 41 may include the sliding portion 47 and the main body support part 45 may include the pin 42 having the ball portion 42a.

What is claimed is:

1. An opening and closing device comprising:
   an outer cylinder;
   an inner cylinder that is disposed inside the outer cylinder, is supported movably relative to the outer cylinder and has a fluid passage therein; and
   a damper group that includes three dampers disposed in the fluid passage so that the fluid passage is openable and closable,
   wherein
   the three dampers are arranged in a circumferential direction of the fluid passage and disposed in the fluid passage in such a way that inner peripheral edges of the dampers are opposed to each other,
   each of the dampers is swingably supported to the inner cylinder and a tilt angle of the dampers to an axial direction of the fluid passage is changed by swinging each of the three dampers relative to the inner cylinder in order to adjust the flow amount of fluid passing through the fluid passage,
   the opening and closing device further comprises an angle control unit configured to control the tilt angle of each of the three dampers in conjunction with movement of the inner cylinder relative to the outer cylinder,
   the inner peripheral edge of each of the three dampers is disposed on the upstream side of the fluid passage and the outer peripheral edge of each of the three dampers is disposed on the downstream side of the fluid passage,
   each of the three dampers has a diffusion blowing position where an opening area of the outer peripheral edge disposed on the downstream side of the respective damper is larger than an opening area of the inner peripheral edge disposed on the upstream side of the respective damper,
   each of the three dampers has an intensive blowing position where an opening area of the outer peripheral edge disposed on the downstream side of the respective damper is smaller than an opening area of the inner peripheral edge disposed on the upstream side of the respective damper, and
   the inner peripheral edges of the three dampers are opposed to each other across an open space when the opening and closing device is in an open position.

2. The opening and closing device according to claim 1, wherein spaces between outer peripheral edges of the three dampers and the inner cylinder are fully closed and a space among the inner peripheral edges of the three dampers is fully closed when the three dampers are in a closed position where the tilt angle is maximized, and
   the spaces between the outer peripheral edges of the three dampers and the inner cylinder are opened and the space among the inner peripheral edges of the three dampers is opened by reducing the tilt angle of each of the three dampers from the maximum tilt angle in the closed position.

3. The opening and closing device according to claim 1, wherein the inner cylinder includes a plural sets of paired bearing portions that are provided in an inner peripheral surface and disposed in positions spaced in the circumferential direction, and
   each of the three dampers includes a pair of support parts that is pivotally supported to each of the paired bearing portion of the inner cylinder, the outer peripheral edge of each damper is formed radially outward of the support parts in between the pair of support parts and the inner peripheral edge of each damper is formed radially inward of the support parts in between the pair of support parts.

4. The opening and closing device according to claim 3, wherein a plurality of bearing portions is arranged at positions that are located at equal intervals in the circumferential direction of the inner cylinder and each damper is swung while using, as a pivot axis, a chord connecting linearly respective bearing portions.

5. The opening and closing device according to claim 1, wherein the inner cylinder is pivoted in the circumferential direction with respect to the outer cylinder and the angle control unit adjusts the tilt angle of the three dampers in conjunction with the pivoting of the inner cylinder.

6. The opening and closing device according to claim 5, wherein the angle control unit includes a protrusion protruded from an outer surface of at least one of the three dampers and a guide groove that is formed in an inner peripheral surface of the outer cylinder and causes the protrusion to move axially in conjunction with the pivoting of the inner cylinder.

7. The opening and closing device according to claim 5, wherein the angle control unit includes a pinion protruded from an outer surface of each of the three dampers and a rack that is formed in an inner peripheral surface of the outer cylinder and meshed with the pinion.

8. The opening and closing device according to claim 1, further comprising:
   a cylindrical retainer that integrally and rotatably accommodates a main body including the outer cylinder, the inner cylinder and the damper group; and
   a connection support part that is fixed to the retainer and positioned in the axial center of the retainer to pivotably support the main body.

9. The opening and closing device according to claim 8, further comprising:
   a main body support part that is fixed to the inner cylinder, positioned in the axial center of the inner cylinder and pivotably supported to the connection support part.

10. The opening and closing device according to claim 9, wherein the connection support part is fixed to the retainer by being connected to a first rib extending radially inward from the retainer and the main body support part is fixed to the inner cylinder by being connected to a second rib extending radially inward from the inner cylinder.

11. The opening and closing device according to claim 8, wherein the inner peripheral edges of the three dampers are disposed on the downstream side of the outer peripheral edges of respective dampers and the connection support part is disposed on the upstream side of respective dampers.

12. The opening and closing device according to claim 8, wherein one of the connection support part and the main body support part has a ball portion at a leading end thereof and the other of the connection support part and the main body support part has a sliding portion in which the ball portion is pivotably slid.

13. The opening and closing device according to claim 1, wherein the damper group consists of three dampers.

14. The opening and closing device according to claim 1, wherein the three dampers are each single, integral units capable of tilting on separate axes.

15. The opening and closing device according to claim 14, wherein the separate axes each form a chord with respect to a circular circumference of the inner cylinder.

16. The opening and closing device according to claim 1, wherein the three dampers are formed inside of a circular circumference of the inner cylinder.

17. The opening and closing device according to claim 1, wherein the three dampers are each connected at respective first and second ends to the inner cylinder.

18. The opening and closing device according to claim 1, wherein each of the three dampers is pivotably supported to the inner cylinder and a tilt angle of each of the three dampers to an axial direction of the fluid passage is changed by pivoting each of the three dampers relative to the inner cylinder in order to adjust the flow amount of fluid passing through the fluid passage.

* * * * *